US011239968B2

(12) United States Patent
Takeda et al.

(10) Patent No.: US 11,239,968 B2
(45) Date of Patent: Feb. 1, 2022

(54) DETERMINING SINGLE-FREQUENCY NETWORK QUASI CO-LOCATION SOURCE

(71) Applicant: QUALCOMM Incorporated, San Diego, CA (US)

(72) Inventors: Kazuki Takeda, Tokyo (JP); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 43 days.

(21) Appl. No.: 16/903,635

(22) Filed: Jun. 17, 2020

(65) Prior Publication Data
US 2021/0028898 A1 Jan. 28, 2021

Related U.S. Application Data

(60) Provisional application No. 62/877,172, filed on Jul. 22, 2019.

(51) Int. Cl.
*H04L 5/00* (2006.01)
*H04W 72/04* (2009.01)
*H04W 24/10* (2009.01)

(52) U.S. Cl.
CPC .......... *H04L 5/0048* (2013.01); *H04L 5/0053* (2013.01); *H04W 24/10* (2013.01); *H04W 72/042* (2013.01)

(58) Field of Classification Search
CPC .... H04L 5/0048; H04L 5/0053; H04W 24/10; H04W 72/042
See application file for complete search history.

(56) References Cited

U.S. PATENT DOCUMENTS

2018/0323830 A1 11/2018 Park et al.
2020/0178279 A1* 6/2020 Frenne ................ H04W 72/12
2020/0374717 A1* 11/2020 He ........................ H04W 24/04

FOREIGN PATENT DOCUMENTS

EP 2905910 A1 8/2015

OTHER PUBLICATIONS

Huawei et al.: "NR Uu and LTE Uu Support and Enhancement for Advanced V2X Use Cases", 3GPP Draft; R1-1812212, 3rd Generation Partnership Project (3GPP), Mobile Competence Centre; 650, Route Des Lucioles; F-06921 Sophia-Antipolis Cedex; France, vol. RAN WG1, No. Spokane, USA; 20181112-20181116 Nov. 11, 2018 (Nov. 11, 2018), XP051554084, 9 pages, Retrieved from the Internet: URL: http://www.3gpp.org/ftp/Meetings%5F3GPP% 5FSYNC/RAN1/Docs/R1%2D1812212%2Ezip [retrieved on Nov. 11, 2018].

(Continued)

*Primary Examiner* — Ronald B Abelson
(74) *Attorney, Agent, or Firm* — Harrity & Harrity, LLP; Kevin M. Donnelly

(57) ABSTRACT

Various aspects of the present disclosure generally relate to wireless communication. In some aspects, a user equipment (UE) may obtain measurements related to a plurality of reference signals received by the UE. In some aspects, each of the plurality of reference signals is associated with a different set of quasi co-location (QCL) properties. The UE may determine a QCL property based at least in part on the measurements related to the plurality of reference signals. The UE may determine, based at least in part on the determined QCL property, a QCL relationship among the plurality of reference signals and a physical downlink shared channel (PDSCH). The UE may receive the PDSCH based at least in part on the QCL relationship. Numerous other aspects are provided.

30 Claims, 19 Drawing Sheets

(56) References Cited

OTHER PUBLICATIONS

International Search Report and Written Opinion—PCT/US2020/038330—ISA/EPO—dated Sep. 30, 2020.

* cited by examiner

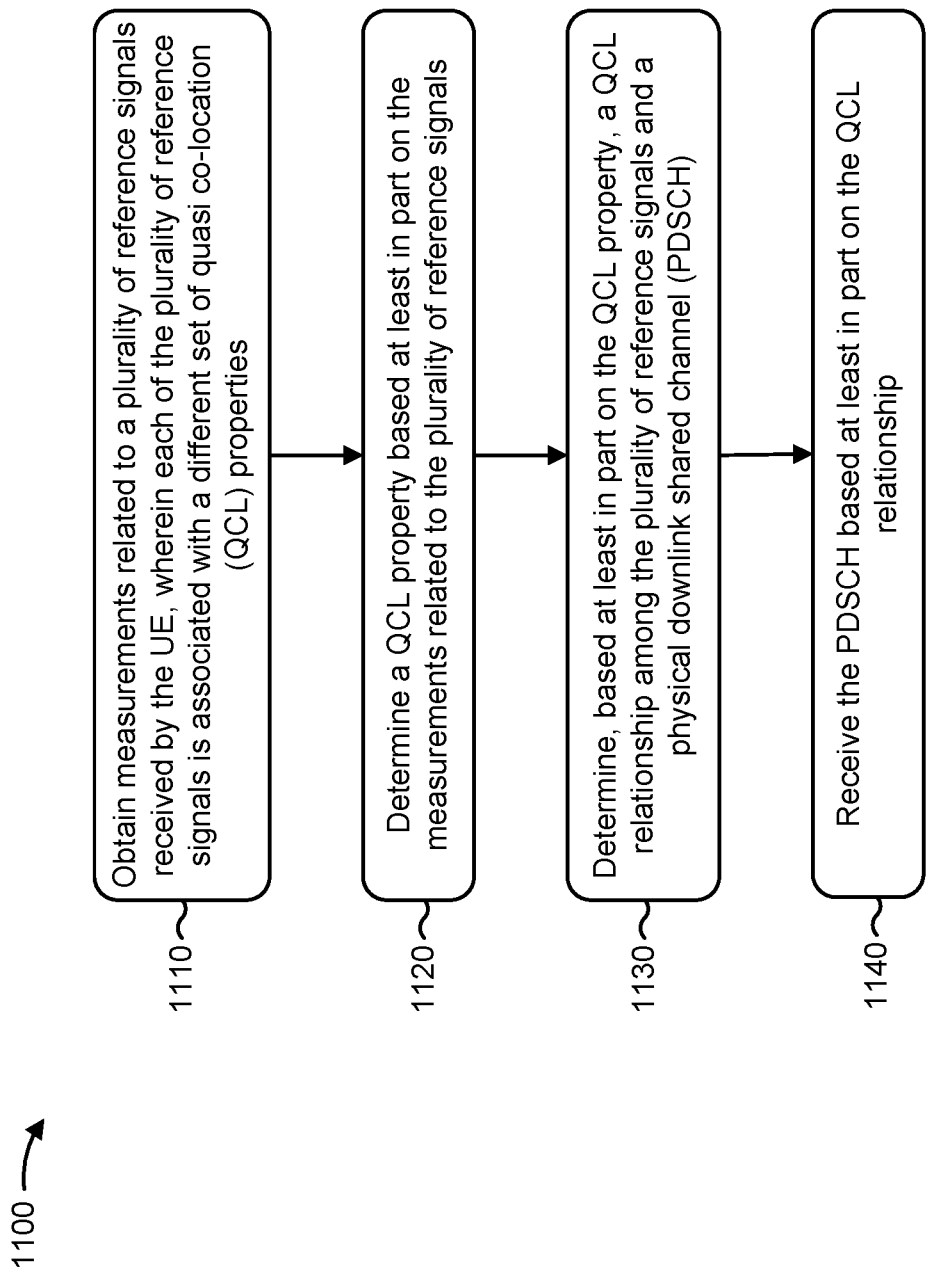

DETERMINING SINGLE-FREQUENCY NETWORK QUASI CO-LOCATION SOURCE

CROSS-REFERENCE TO RELATED APPLICATION

This Patent Application claims priority to U.S. Provisional Patent Application No. 62/877,172, filed on Jul. 22, 2019, entitled "DETERMINING SINGLE-FREQUENCY NETWORK QUASI CO-LOCATION SOURCE FOR MULTICAST," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for determining one or more quasi co-location (QCL) relationships based on reference signals associated with different sets of QCL properties.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, or transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipments (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDMA (for example, also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

In some cases, NR and similar radio access technologies (RATs) may support multicast operations to simultaneously disseminate data, such as emergency alerts or audio or video content, among many other possibilities, to multiple UEs that may be located in the same or different cells. In general, because multicast operations enable multiple UEs to receive the same data at substantially the same time, multicast operations can reduce network overhead relative to unicast operations in which a particular transmission is received by a single UE. In LTE, multicast operations are generally supported using enhanced multimedia broadcast/multicast service (eMBMS) and single-cell point-to-multipoint (SC-PTM) services. For example, in eMBMS, multicast data is transmitted in multiple cells in a particular area and the multicast data is received by a group of UEs that are located in the particular area. In SC-PTM, multicast data is transmitted in a particular cell and the multicast data is received by a group of UEs that are located in the particular cell. However, eMBMS and SC-PTM generally enable multicast transmissions via single-frequency network (SFN) configurations, where one or more transmitters send multicast data over a particular frequency channel. This poses challenges with respect to implementing support for multicast operations in NR and similar RATs in which both SFN and non-SFN operation may be supported.

SUMMARY

In some aspects, a method of wireless communication, performed by a user equipment (UE), may include obtaining measurements related to a plurality of reference signals received by the UE, wherein each of the plurality of reference signals is associated with a different set of quasi co-location (QCL) properties. The method may include determining a QCL property based at least in part on the measurements related to the plurality of reference signals. The method may include determining, based at least in part on the determined QCL property, a QCL relationship among the plurality of reference signals and a physical downlink shared channel (PDSCH). The method may include receiving the PDSCH based at least in part on the QCL relationship.

In some aspects, a UE for wireless communication may include a memory and one or more processors operatively coupled to the memory. The memory and the one or more processors may be configured to obtain measurements related to a plurality of reference signals received by the UE, wherein each of the plurality of reference signals is associated with a different set of QCL properties. The memory and the one or more processors may be configured to determine a QCL property based at least in part on the measurements related to the plurality of reference signals. The memory and the one or more processors may be configured to determine, based at least in part on the determined QCL property, a QCL relationship among the plurality of reference signals and a PDSCH. The memory and the one or more processors may be configured to receive the PDSCH based at least in part on the QCL relationship.

In some aspects, a non-transitory computer-readable medium may store one or more instructions for wireless communication. The one or more instructions, when executed by one or more processors of a UE, may cause the one or more processors to obtain measurements related to a plurality of reference signals received by the UE, wherein each of the plurality of reference signals is associated with a different set of QCL properties. The one or more instructions, when executed by the one or more processors of the UE, may cause the one or more processors to determine a QCL property based at least in part on the measurements related to the plurality of reference signals. The one or more instructions, when executed by the one or more processors of the UE, may cause the one or more processors to determine, based at least in part on the determined QCL property, a QCL relationship among the plurality of reference signals and a PDSCH. The one or more instructions, when executed by the one or more processors of the UE, may cause the one or more processors to receive the PDSCH based at least in part on the QCL relationship.

In some aspects, an apparatus for wireless communication may include means for obtaining measurements related to a plurality of reference signals received by the apparatus, wherein each of the plurality of reference signals is associated with a different set of QCL properties. The apparatus may include means for determining a QCL property based at least in part on the measurements related to the plurality of reference signals. The apparatus may include means for determining, based at least in part on the determined QCL property, a QCL relationship among the plurality of reference signals and a PDSCH. The apparatus may include means for receiving the PDSCH based at least in part on the QCL relationship.

Aspects generally include a method, device, apparatus, system, computer program product, non-transitory computer-readable medium, user equipment, base station, transmit receive point, wireless communication device, network node, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 11 is a diagram illustrating an example process performed by a UE in accordance with various aspects of the present disclosure.

DETAILED DESCRIPTION

Figure 1:
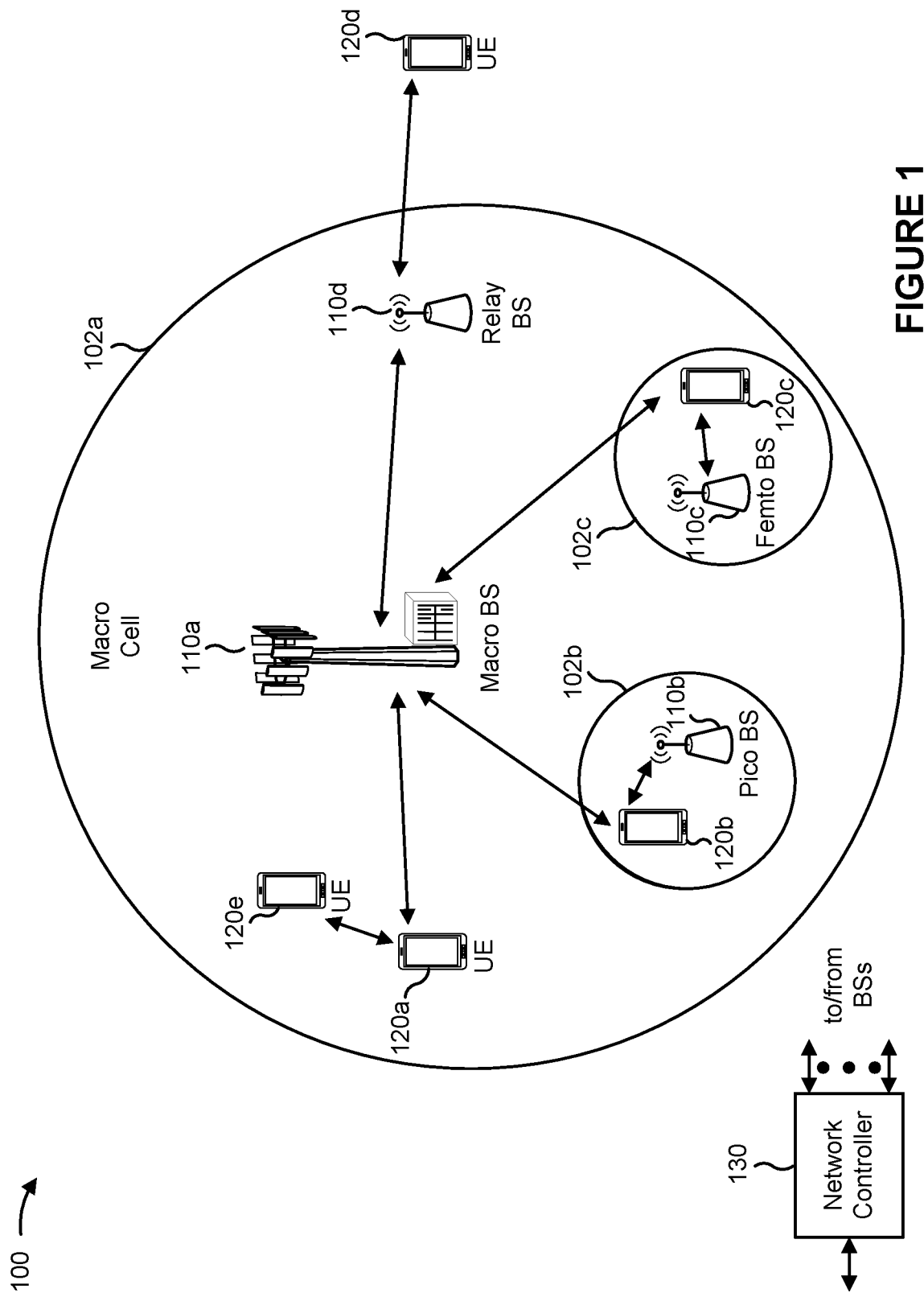
FIG. 1 is a diagram illustrating an example of a wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology associated with a 5G or NR radio access technology (RAT), aspects of the present disclosure can be applied to other RATs, such as a 3G RAT, a 4G RAT, or a RAT subsequent to 5G (e.g., 6G), among other examples.

In some cases, NR and similar radio access technology (RAT) types may support multicast operations to simultaneously disseminate data, such as emergency alerts or audio or video content, among many other possibilities, to multiple user equipments (UEs) that may be located in the same or different cells. In general, because multicast operations enable multiple UEs to receive the same data at substantially the same time, multicast operations can reduce network overhead relative to unicast operations in which a particular transmission is received by a single UE. In a Long Term Evolution (LTE) network, multicast operations may be supported using enhanced multimedia broadcast/multicast service (eMBMS), single-cell point-to-multipoint (SC-PTM) services, among other possibilities. For example, in eMBMS, multicast data is transmitted in multiple cells in a particular area and the multicast data is received by a group of UEs that are located in the particular area. In SC-PTM, multicast data is transmitted in a particular cell and the multicast data is received by a group of UEs that are located in the particular cell. However, eMBMS, SC-PTM, and similar services that support multicast operations in LTE enable multicast transmissions via single-frequency network (SFN) configurations, where each transmitter sends the multicast data over the same frequency channel. This poses challenges with respect to implementing multicast support in NR and similar RAT types that may support both SFN and non-SFN operation.

Some techniques and apparatuses described herein provide a UE with a capability to determine a quasi co-location (QCL) relationship among a set of reference signals and a physical downlink shared channel (PDSCH) that one or more transmit receive points (TRPs) can use to transmit multicast data. For example, in a multicast configuration where different TRPs communicate in accordance with an SFN, the different TRPs may generally transmit reference signals that provide a QCL source for a control resource set (CORESET) transmitted on a physical downlink control channel (PDCCH) scheduling the PDSCH, and the CORESET provides a QCL source for the PDSCH. In other words, because the reference signals, the CORESET, and the PDSCH are all transmitted from the same set of TRPs over the same frequency channel at substantially the same time, the UE can infer that the PDSCH is quasi co-located (QCLed) with the CORESET and that the CORESET is QCLed with the reference signals. Accordingly, in a non-SFN configuration where different reference signals received by the UE are associated with different sets of QCL properties (for example, the different reference signals are orthogonal to one another), the UE may determine a QCL property, such as a virtual QCL source, based on measurements that relate to the different reference signals. In some aspects, the QCL property can be used as a QCL source for the PDSCH. Furthermore, in some aspects, the QCL property can be used as a QCL source for the CORESET scheduling the PDSCH. In this way, the QCL property enables the UE to receive multicast data that may be associated with different QCL properties.

FIG. 1 is a diagram illustrating an example of a wireless network 100 in accordance with various aspects of the present disclosure. The wireless network 100 may be or may include elements of a 5G (NR) network or an LTE network, among other examples. The wireless network 100 may include one or more base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP), among other examples. Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

The wireless network 100 may be a heterogeneous network that includes BSs of different types, for example, macro BSs, pico BSs, femto BSs, or relay BSs, among other examples, or combinations thereof. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, or a virtual network, among other examples, or combinations thereof using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, or a relay, among other examples, or combinations thereof.

UEs 120 (for example, 120a, 120b, 120c) may be dispersed throughout the wireless network 100, and each UE may be stationary or mobile. A UE may also be referred to as an access terminal, a terminal, a mobile station, a subscriber unit, or a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved or enhanced machine-type communication (eMTC) UEs. MTC and eMTC UEs include, for example, robots, drones, remote devices, sensors, meters, monitors or location tags, among other examples, or combinations thereof, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, or memory components, among other examples, or combinations thereof. In some aspects, the processor components and the memory components may be coupled together. For example, the processor components (for example, one or more processors) and the memory components (for example, a memory) may be operatively coupled, communicatively coupled, electronically coupled, or electrically coupled, among other examples.

In general, any quantity of wireless networks may be deployed in a given geographic area. Each wireless network may support a particular radio access technology (RAT) and may operate on one or more frequencies or frequency channels. A frequency may also be referred to as a carrier among other examples. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, or a vehicle-to-infrastructure (V2I) protocol, among other examples, or combinations thereof), or a mesh network, among other examples, or combinations thereof. In such examples, the UE 120 may perform scheduling operations, resource selection operations, or other operations described elsewhere herein as being performed by the base station 110.

Devices of the wireless network may communicate using the electromagnetic spectrum, which may be subdivided based on frequency or wavelength into various classes, bands, or channels. For example, devices of the wireless network may communicate using an operating band having a first frequency range (FR1), which may span from 410 MHz to 7.125 GHz. As another example, devices of the wireless network may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. The frequencies included in FR1 and FR2 may be modified, and techniques described herein are applicable to those modified frequency ranges.

Figure 2:
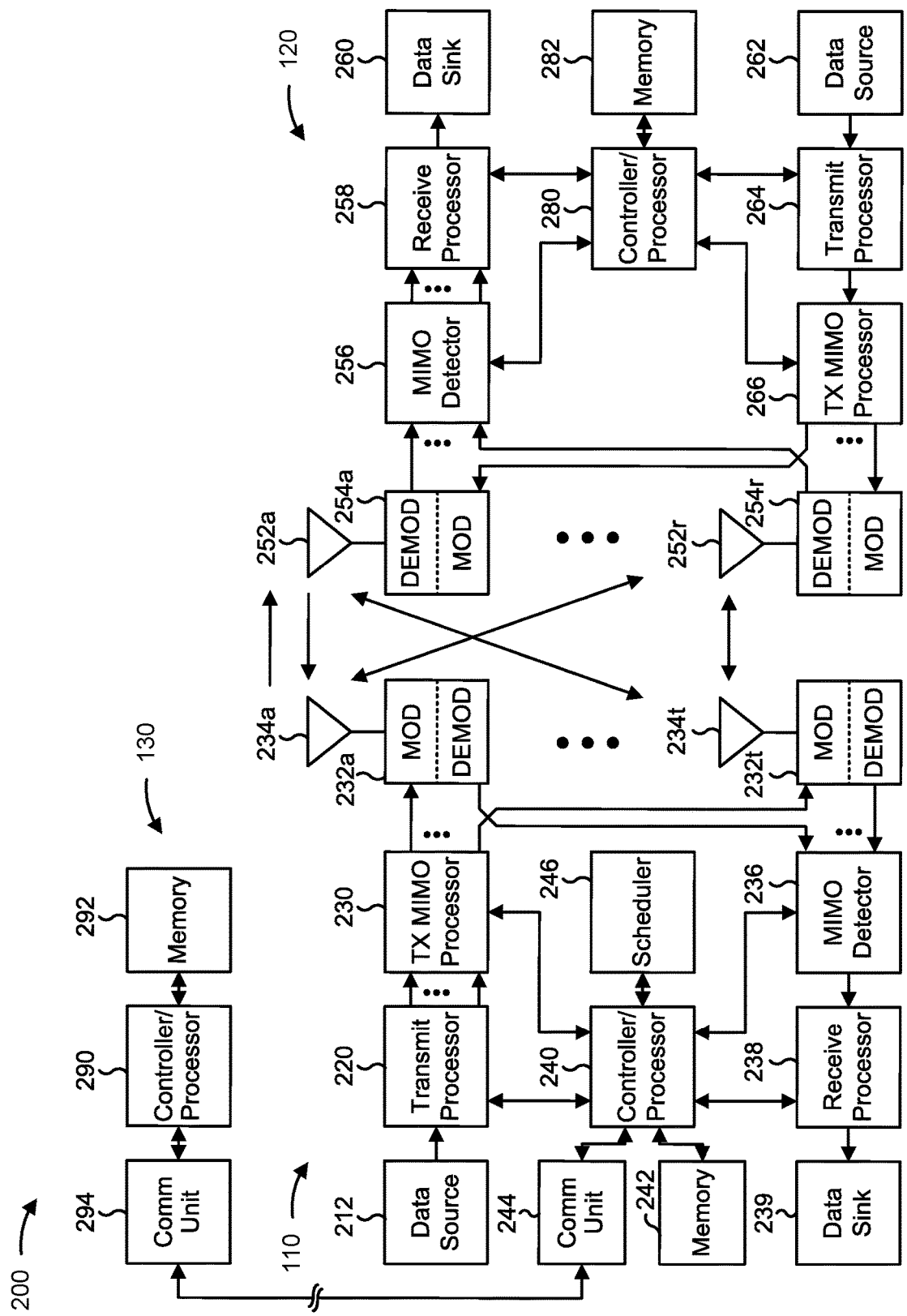
FIG. 2 is a diagram illustrating an example base station (BS) in communication with a user equipment (UE) in a wireless network in accordance with various aspects of the present disclosure.

FIG. 2 is a diagram 200 illustrating an example base station in communication with a UE in a wireless network in accordance with various aspects of the present disclosure. The base station may correspond to base station 110 of FIG. 1. Similarly, the UE may correspond to UE 120 of FIG. 1.

Base station 110 may be equipped with T antennas 234a through 234t, and UE 120 may be equipped with R antennas 252a through 252r, where in general T≥1 and R≥1. At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples) and control information (for example, CQI requests, grants, or upper layer signaling, among other examples, or combinations thereof) and provide overhead symbols and control symbols. Transmit processor 220 may also generate reference symbols for reference signals and synchronization signals. A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively.

At UE 120, antennas 252a through 252r may receive the downlink signals from base station 110 or other base stations and may provide received signals to R demodulators (DE-MODs) 254a through 254r, respectively. Each DEMOD 254 may condition (for example, filter, amplify, downconvert, and digitize) a received signal to obtain input samples. Each DEMOD 254 may further process the input samples (for example, for OFDM) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP), a received signal strength indicator (RSSI), a reference signal received quality (RSRQ), or a channel quality indicator (CQI), among other examples, or combinations thereof. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 as well as control information (for example, for reports including RSRP, RSSI, RSRQ, or CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), or orthogonal frequency division multiplexing (OFDM) with a cyclic prefix (CP) (CP-OFDM), among other examples, or combinations thereof), and transmitted to base station 110. In some aspects, the UE 120 includes a transceiver. The transceiver may include any combination of antenna(s) 252, modulators 254, demodulators 254, MIMO detector 256, receive processor 258, transmit processor 264, or TX MIMO processor 266. The transceiver may be used by a processor (for example, controller/processor 280) and memory 282 to perform aspects of any of the methods described herein.

At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and uplink communications. In some aspects, the base station 110 includes a transceiver. The transceiver may include any combination of antenna(s) 234, modulators 232, demodulators 232, MIMO detector 236, receive processor 238, transmit processor 220, or TX MIMO processor 230. The transceiver may be used by a processor (for example, controller/processor 240) and memory 242 to perform aspects of any of the methods described herein.

Controller/processor 240 of base station 110, controller/processor 280 of UE 120, or any other component(s) of FIG. 2 may perform one or more techniques associated with determining an SFN QCL source for multicast based on various reference signals that have different sets of QCL properties, as described in more detail elsewhere herein. For example, controller/processor 240 of base station 110, controller/processor 280 of UE 120, or any other component(s) of FIG. 2 may perform or direct operations of, for example, process 1100 of FIG. 11 or other processes as described herein. Memories 242 and 282 may store data and program codes for base station 110 and UE 120, respectively. In some aspects, memory 242 or memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 1100 of FIG. 11 or other processes as described herein. In some aspects, executing instructions may include running the instructions, converting the instructions, compiling the instructions, or interpreting the instructions, among other examples.

In some aspects, UE 120 may include means for obtaining measurements related to a plurality of reference signals received by the UE 120, wherein each of the plurality of reference signals is associated with a different set of QCL properties, means for determining a QCL property based at least in part on the measurements related to the plurality of reference signals, means for determining, based at least in part on the determined QCL property, a QCL relationship among the plurality of reference signals and a PDSCH, means for receiving the PDSCH based at least in part on the QCL relationship, among other examples, or combinations thereof. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, or receive processor 258.

Figure 3A:
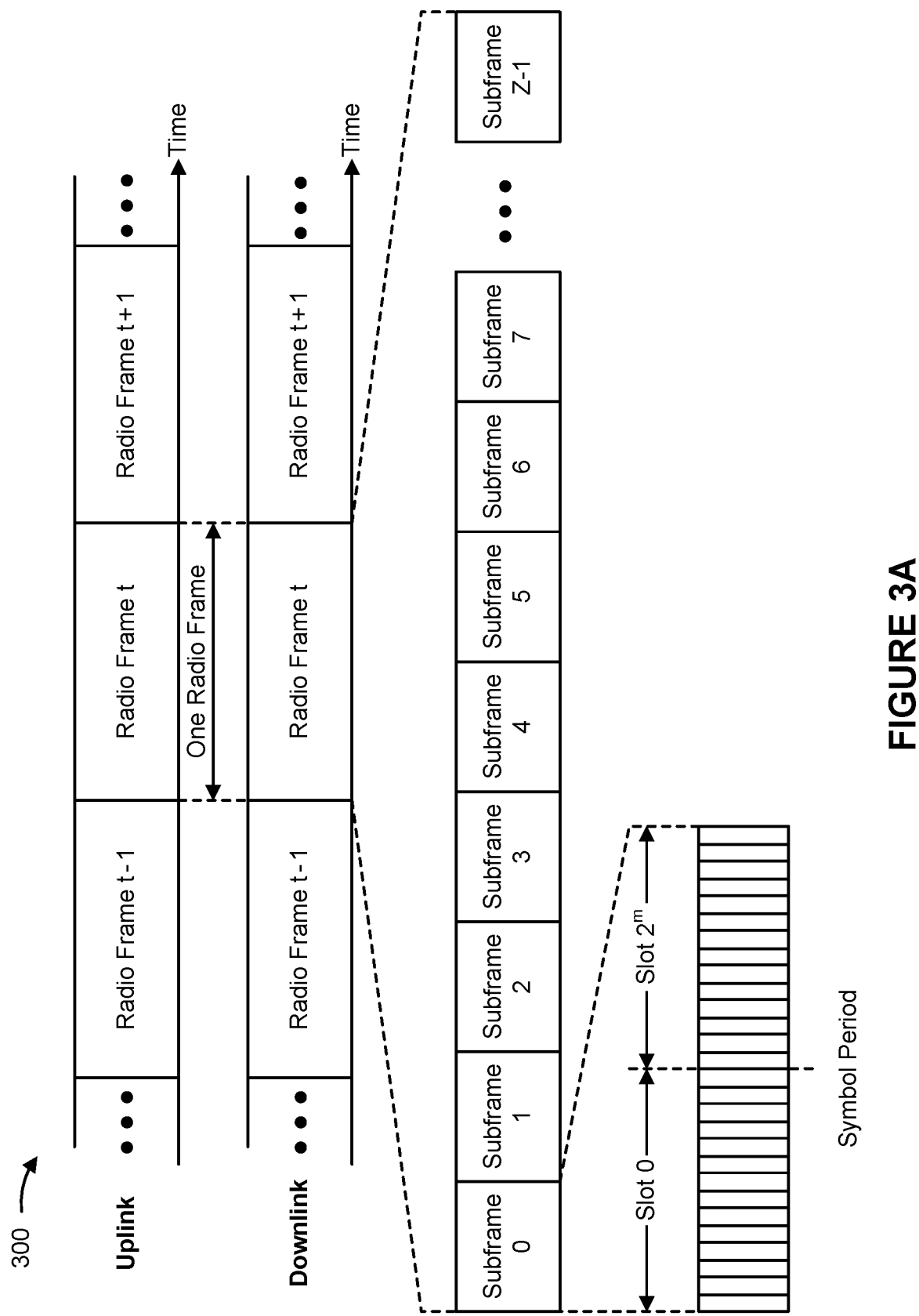
FIG. 3A is a diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, $2^m$ slots per subframe are shown in FIG. 3A, where m is a numerology used for a transmission, such as 0, 1, 2, 3, 4, among other examples, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, or symbol-based, among other examples, or combinations thereof.

While some techniques are described herein in connection with frames, subframes, or slots, among other examples, or combinations thereof, these techniques may equally apply to other types of wireless communication structures, which may be referred to using terms other than "frame," "subframe," or "slot," among other examples, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), or a secondary synchronization signal (SSS), among other examples, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SS blocks), as described below in connection with FIG. 3B.

Figure 3B:
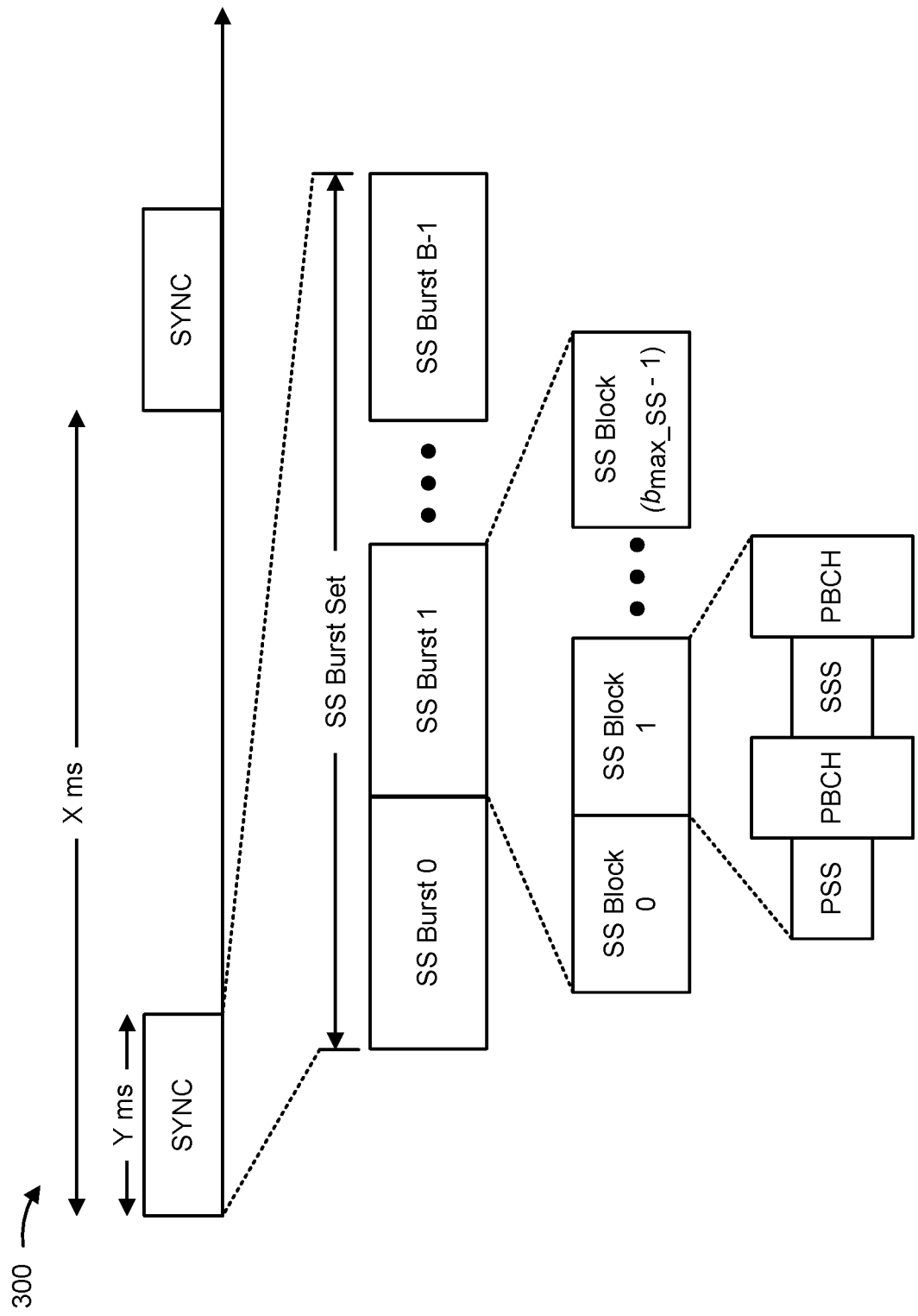
FIG. 3B is a diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. The SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum quantity of repetitions of the SS burst that may be transmitted by the base station). As further shown, each SS burst may include one or more SS blocks (identified as SS block 0 through SS block ($b_{max\_SS}$−1), where $b_{max\_SS}$−1 is a maximum quantity of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, or other synchronization signals (for example, a tertiary synchronization signal (TSS)) or synchronization channels. In some aspects, multiple SS blocks are included in an SS burst, and the PSS, the SSS, or the PBCH may be the same across each SS block of the SS burst. In some aspects, a single SS block may be included in an SS burst. In some aspects, the SS block may be at least four symbol periods in length, where each symbol carries one or more of the PSS (for example, occupying one symbol), the SSS (for example, occupying one symbol), or the PBCH (for example, occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (for example, consecutive symbol periods) during one or more slots. Additionally or alternatively, one or more SS blocks of the SS burst may be transmitted in non-consecutive radio resources.

In some aspects, the SS bursts may have a burst period during which the SS blocks of the SS burst are transmitted by the base station in accordance with the burst period. In other words, the SS blocks may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a PDSCH in some slots. The base station may transmit control information/data on a PDCCH in C symbol periods of a slot, where C may be configurable for each slot. The base station may transmit traffic data or other data on the PDSCH in the remaining symbol periods of each slot.

Figure 4:
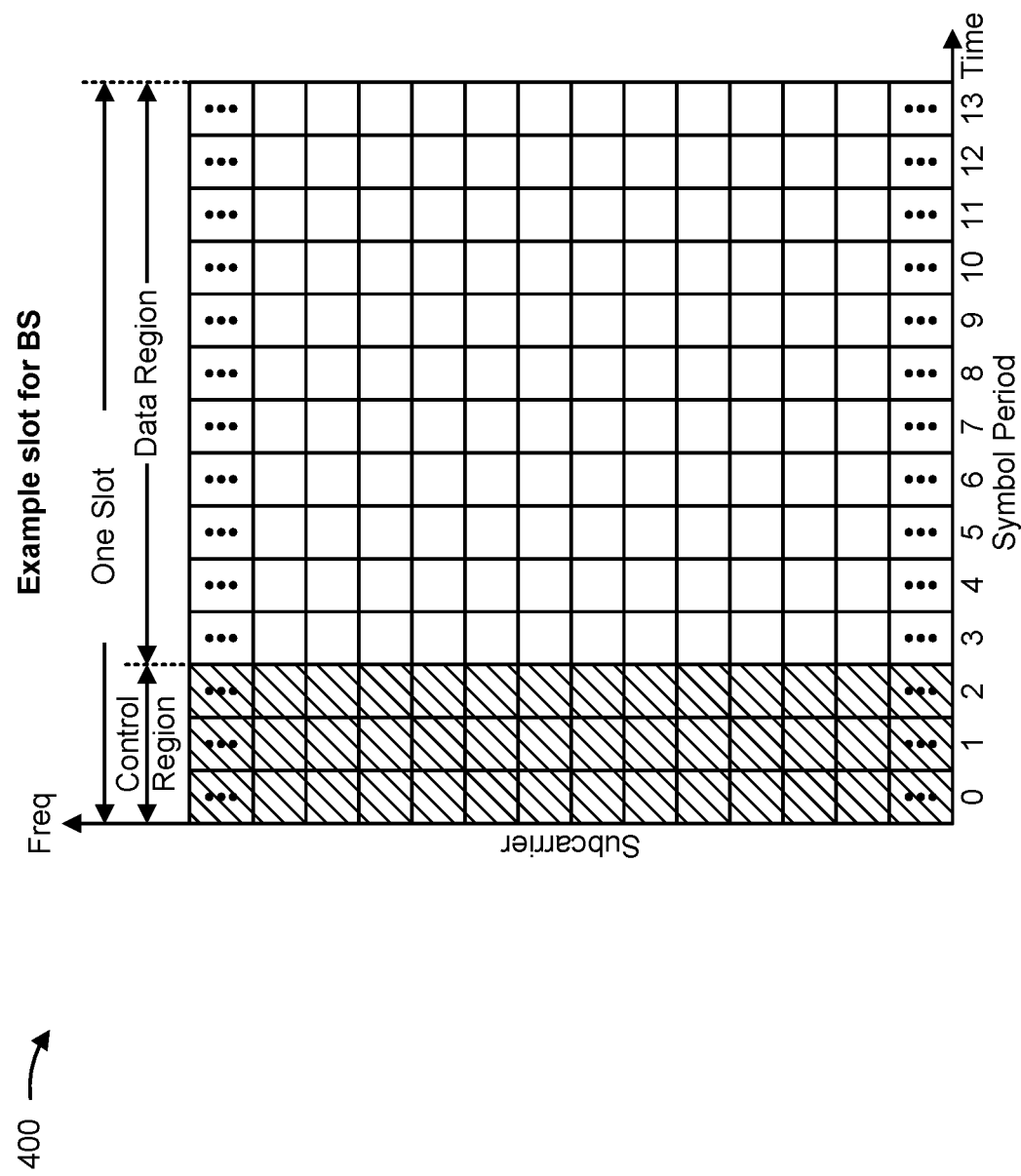
FIG. 4 is a diagram illustrating an example slot format in accordance with various aspects of the present disclosure.

FIG. 4 is a block diagram 400 illustrating an example slot format 400 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, or q+2Q, among other examples, where $q\varepsilon\{0, \ldots, Q-1\}$.

A UE may be located within the coverage of multiple BSs. One of these BSs may be selected to serve the UE. The serving BS may be selected based at least in part on various criteria such as received signal strength, received signal quality, or path loss, among other examples, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In some aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In some aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
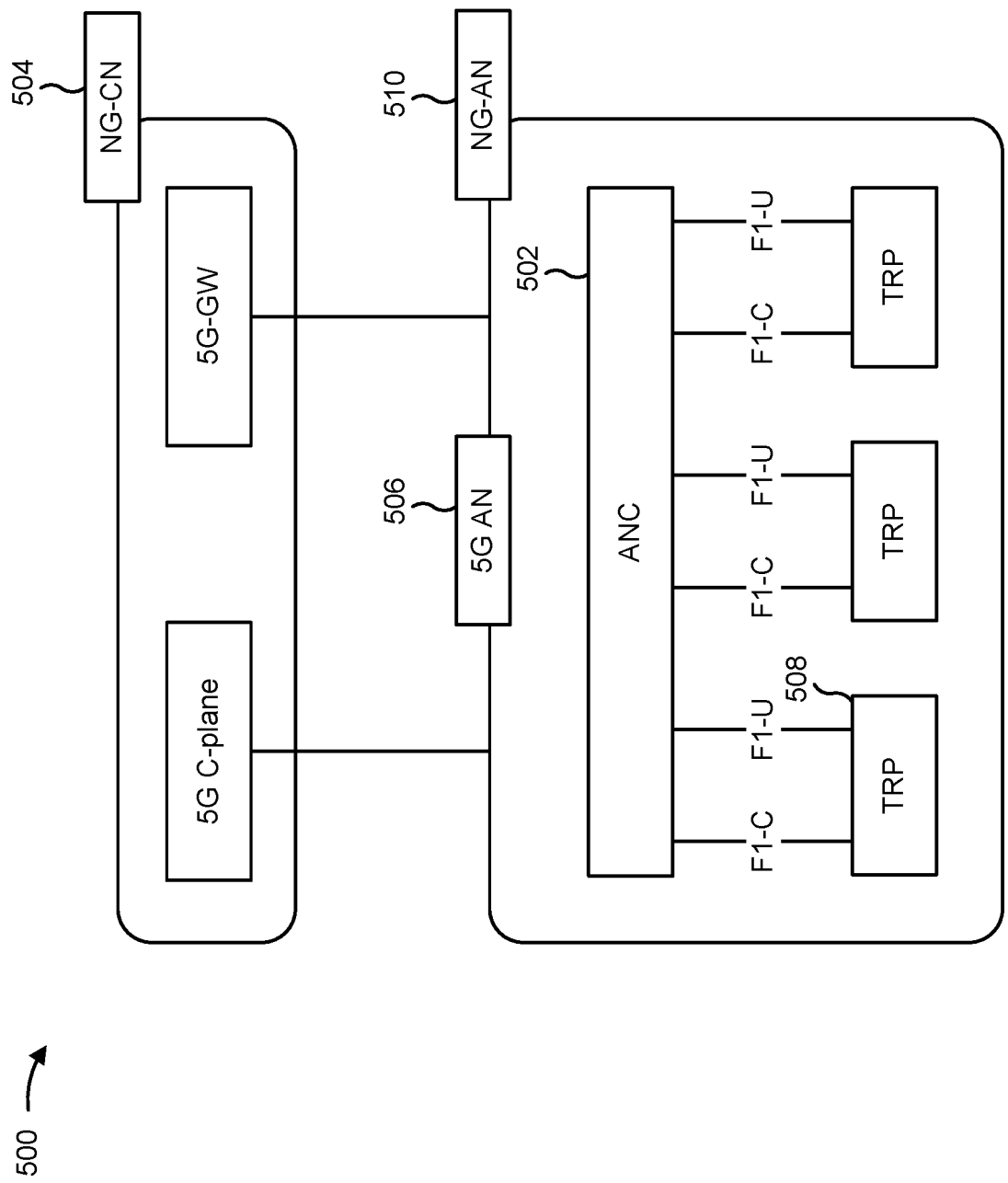
FIG. 5 is a diagram illustrating an example logical architecture of a distributed radio access network (RAN) in accordance with various aspects of the present disclosure.

FIG. 5 illustrates an example logical architecture of a distributed radio access network (RAN) 500 in accordance with various aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, "TRP" may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), and MAC protocol layers may be adaptably placed at the ANC or TRP.

Figure 6:
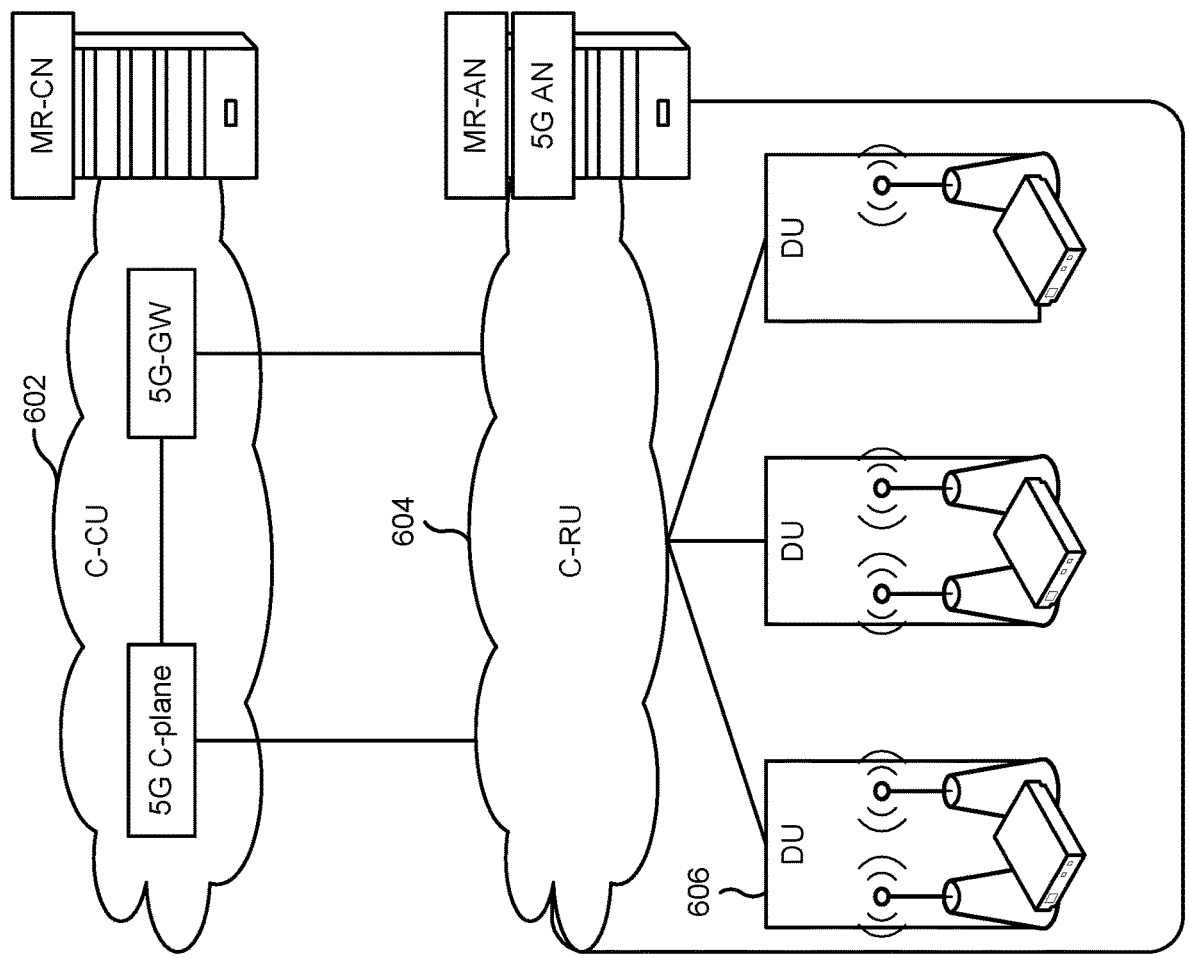
FIG. 6 is a diagram illustrating an example physical architecture of a distributed RAN in accordance with various aspects of the present disclosure.

FIG. 6 illustrates an example physical architecture of a distributed RAN 600 in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

In some cases, NR and similar RAT types may support multicast operations to simultaneously disseminate data, such as emergency alerts or audio or video content, among many other possibilities, to multiple UEs that may be located in the same or different cells. In general, because multicast operations enable multiple UEs to receive the same data at substantially the same time, multicast operations can reduce network overhead relative to unicast operations in which a particular transmission is received by a single UE. In an LTE network, multicast operations may be supported using eMBMS, SC-PTM services, among other possibilities. For example, in eMBMS, multicast data is transmitted in multiple cells in a particular area and the multicast data is received by a group of UEs that are located in the particular area. In SC-PTM, multicast data is transmitted in a particular cell and the multicast data is received by a group of UEs that are located in the particular cell. However, eMBMS, SC-PTM, and similar services that support multicast operations in LTE enable multicast transmissions via SFN configurations, where each transmitter sends the multicast data over the same frequency channel. This poses challenges with respect to implementing multicast support in NR and similar RAT types that may support both SFN and non-SFN operation.

Some techniques and apparatuses described herein provide a UE with a capability to determine a QCL relationship among a set of reference signals and a PDSCH that one or more TRPs can use to transmit multicast data. For example, in a multicast configuration where different TRPs communicate in accordance with an SFN, the different TRPs may generally transmit reference signals that provide a QCL source for a CORESET transmitted on a PDCCH scheduling the PDSCH, and the CORESET provides a QCL source for the PDSCH. In other words, because the reference signals, the CORESET, and the PDSCH are all transmitted from the same TRPs, the UE can infer that the PDSCH is QCLed with the CORESET and that the CORESET is QCLed with the reference signals. Accordingly, in a non-SFN configuration where different reference signals received by the UE are associated with different sets of QCL properties (for example, the different reference signals are orthogonal to one another), the UE may determine a QCL property, such as a virtual QCL source, based on measurements that relate to the different reference signals. In some aspects, the QCL property can be used as a QCL source for the PDSCH. Furthermore, in some aspects, the QCL property can be used as a QCL source for the CORESET scheduling the PDSCH. In this way, the QCL property enables the UE to receive multicast data that may be associated with different QCL properties.

Figure 7A:
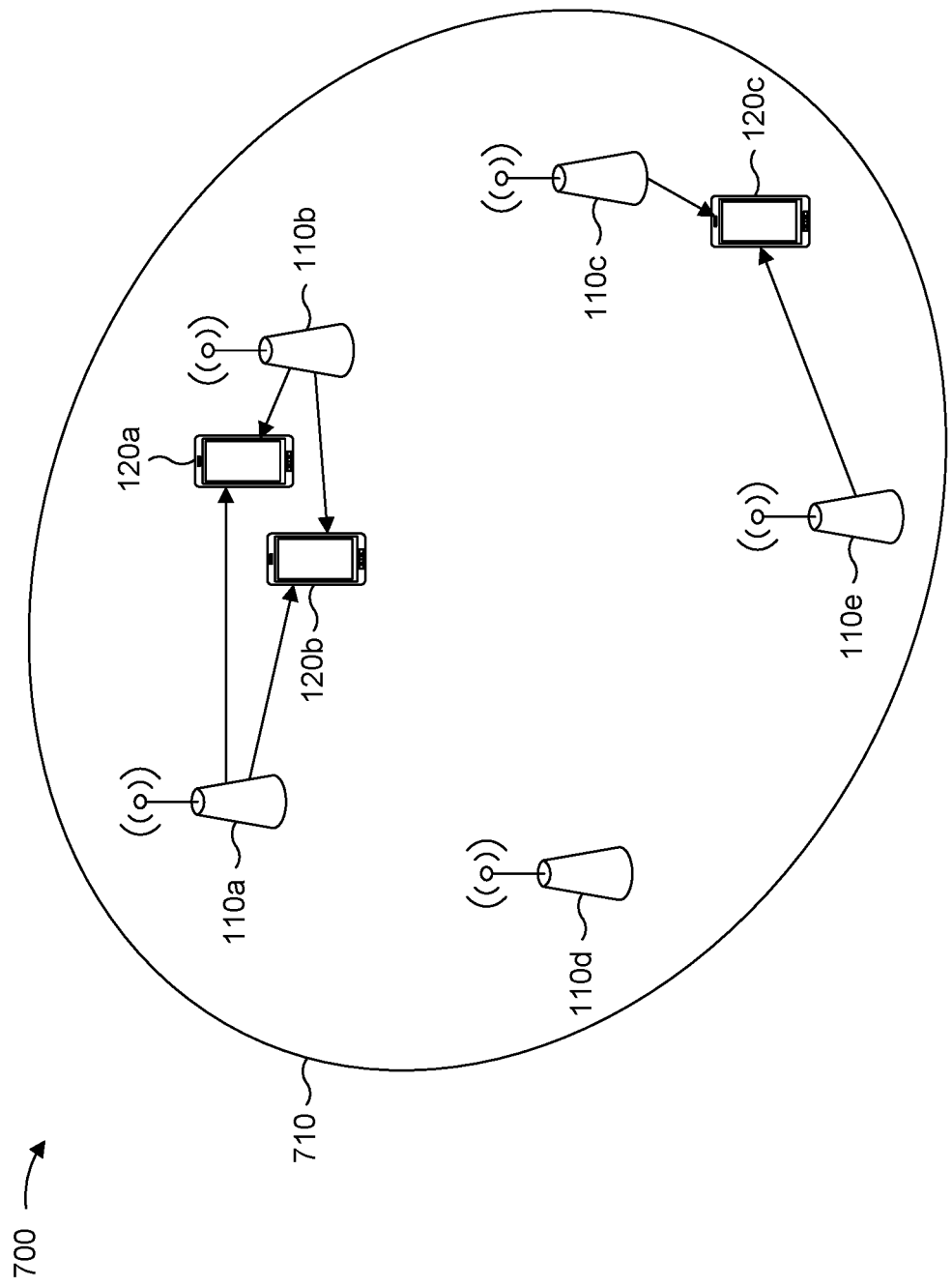
FIGS. 7A-7C are diagrams illustrating example multicast configurations in accordance with various aspects of the present disclosure.
Figure 7B:
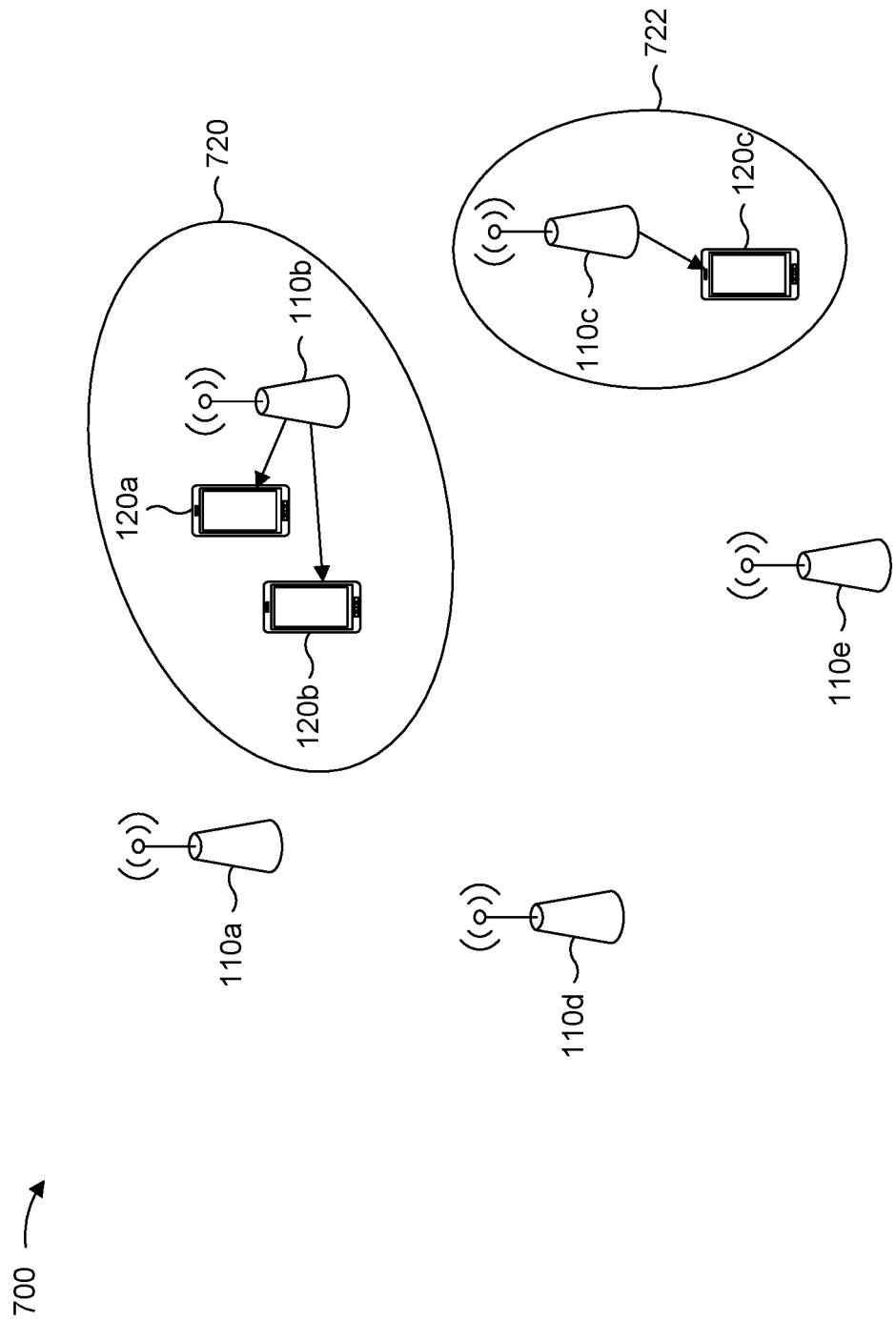
Figure 7C:
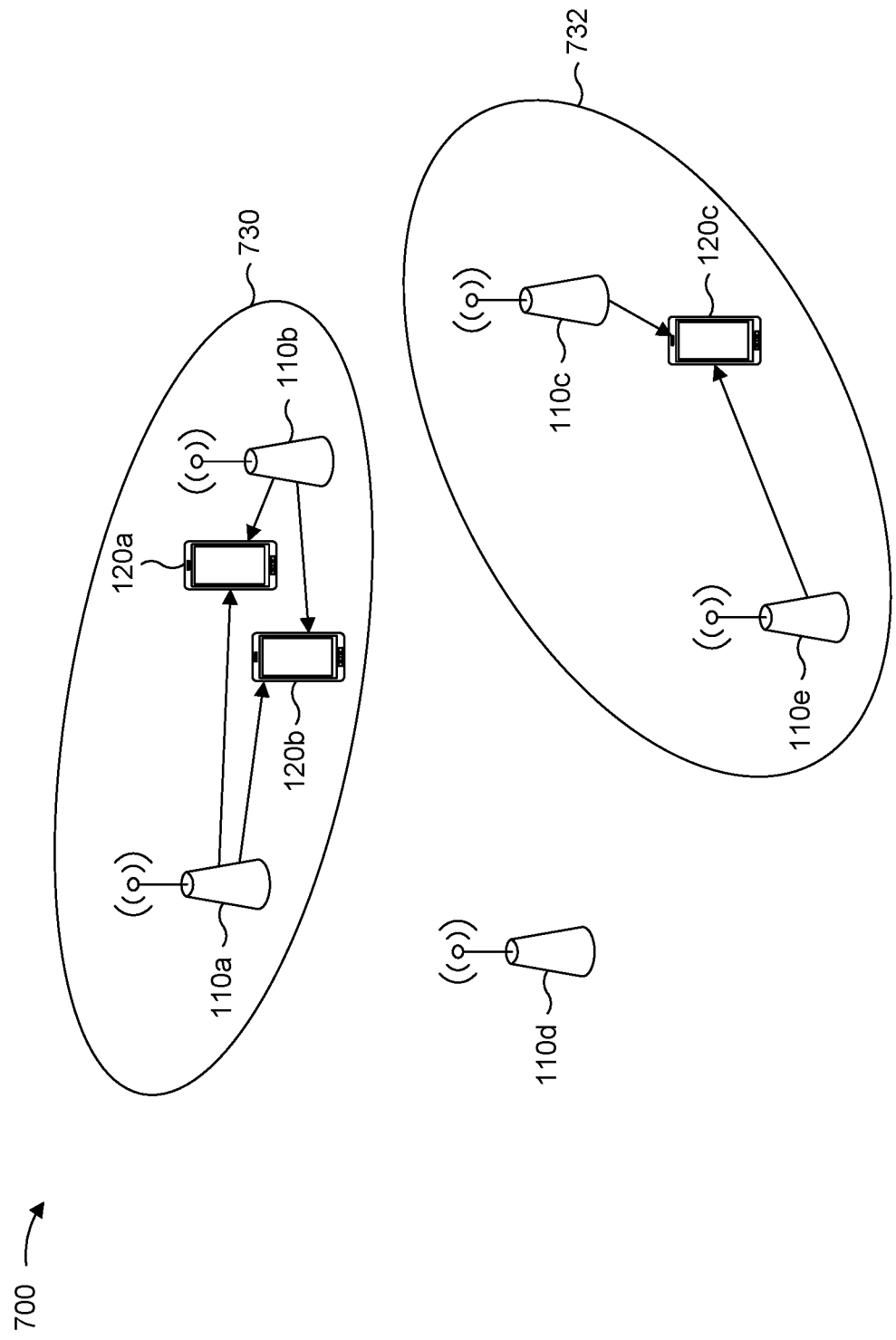

FIGS. 7A-7C are diagrams illustrating example multicast configurations 700 in accordance with various aspects of the present disclosure. In some aspects, the multicast configurations 700 illustrated in FIGS. 7A-7C may be implemented in an NR network. For example, in FIGS. 7A-7C, a UE 120 may be configured with a radio network temporary identifier (RNTI) (for example, a group RNTI (G-RNTI)) to receive multicast data from one or more TRPs 110. In general, the G-RNTI may be used to scramble a cyclic redundancy check (CRC) associated with a PDSCH for multicast data. Furthermore, in some aspects, the G-RNTI may be used to scramble a CRC associated with a PDCCH (or CORESET) scheduling the PDSCH for the multicast data. In some aspects, the NR network may support UEs 120 operating in a mixed mode, in which a UE 120 may operate with simultaneous multicast and unicast service in a particular serving cell, in different serving cells, or in different cell groups, among other possibilities. Furthermore, in some aspects, the NR network may support both SFN and non-SFN operation. For example, in SFN operation, multiple TRPs 110 may simultaneously send the same signal over a particular frequency channel. In contrast, in non-SFN operation, signals that are identified by at least one of time, frequency, or code may have different QCL properties. For example, the non-SFN signals may differ with respect to one or more of time, frequency, or code (for example, the non-SFN signals may be orthogonal).

For example, FIG. 7A illustrates an example multicast configured in a service area 710 that includes various TRPs 110a-110e and UEs 120a-120c. In particular, in the multicast configuration shown in FIG. 7A, UEs 120 may receive multicast transmissions from multiple TRPs 110 in a given service area 710. For example, as shown, the multicast configuration includes UEs 120a, 120b receiving a first multicast transmission from a first TRP 110a and a second multicast transmission from a second TRP 110b. Furthermore, as shown, another UE 120c is receiving multicast transmissions from a pair of TRPs 110c, 110e. In some aspects, the multicast transmissions may include PDSCH transmissions of the same data, which may occur at substantially the same time and over the same frequency channel in an SFN configuration. Additionally or alternatively, the multicast transmissions may be reference signal transmissions (for example, synchronization signal blocks (SSBs), channel state information reference signals (CSI-RS), or tracking reference signals (TRS), among other examples), CORESET PDCCH transmissions, or other suitable transmissions that have different sets of QCL properties in a non-SFN configuration (for example, different Doppler shifts, Doppler spreads, spatial parameters, or delay spreads, among other possibilities).

FIG. 7B illustrates another example multicast configuration in which one or more network nodes (for example, a network controller 130) select a single TRP 110 to be used to transmit multicast data to one or more UEs 120. For example, in FIG. 7B, the one or more network nodes have selected TRP 110b to transmit multicast data to UEs 120a, 120b in a first service area 720 and selected TRP 110c to transmit multicast data to UE 120c in a second service area 722.

FIG. 7C illustrates another example multicast configuration in which the one or more network nodes select a set or group including one or more TRPs 110 to transmit multicast data to one or more UEs 120. For example, in FIG. 7C, the one or more network nodes have selected TRPs 110a, 110b to transmit multicast data to UEs 120a, 120b in a first service area 730 and selected TRPs 110c, 110e to transmit multicast data to UE 120c in a second service area 732.

Accordingly, in the examples illustrated in FIGS. 7B-7C, where the one or more network nodes select the TRP(s) 110 to transmit multicast data to UEs 120, the network nodes may be provided with information related to the UEs 120 (for example, locations, or signal measurements, among other examples) to enable the network nodes to select the appropriate TRP(s) 110 to serve multicast traffic to the UEs 120. In contrast, in FIG. 7A, the network nodes may not know which TRP(s) 110 are contributing to an SFN used to serve PDSCH multicast data to each UE 120. Furthermore, in some aspects, UEs 120 may or may not know which TRP(s) 110 are contributing to the SFN used to serve the PDSCH multicast data to each UE 120. For example, in FIGS. 7A-7C, UEs 120a-120c may be unaware of a direction in which the multicast data is received but are nonetheless able to receive the multicast data (for example, using one or more QCL relationships, as described in further detail elsewhere herein). In other words, the TRP(s) 110 that are contributing to the SFN multicast are transparent (or unknown) to the UEs 120. Alternatively, in some aspects, UEs 120a-120c may know which of the TRP(s) 110a-110e are contributing to the SFN multicast. For example, among the various TRPs 110a-110e from which the UEs 120a-120c are able to receive a signal, the UEs 120 may obtain one or more measurements for each TRP 110, and this information may be used to identify a set of one or more TRP(s) from which to receive the SFN multicast and to determine how to receive the multicast transmission (for example, using one or more QCL relationships among a PDSCH carrying the SFN multicast and other signals transmitted by the TRPs 110, as described in further detail elsewhere herein). In some aspects, when a UE 120 knows the particular TRP(s) 110 contributing to the SFN multicast for the UE 120, the UE 120 may be able to correctly perform equalization, channel estimation, tracking, or other operations to improve multicast data reception.

Figure 8A:
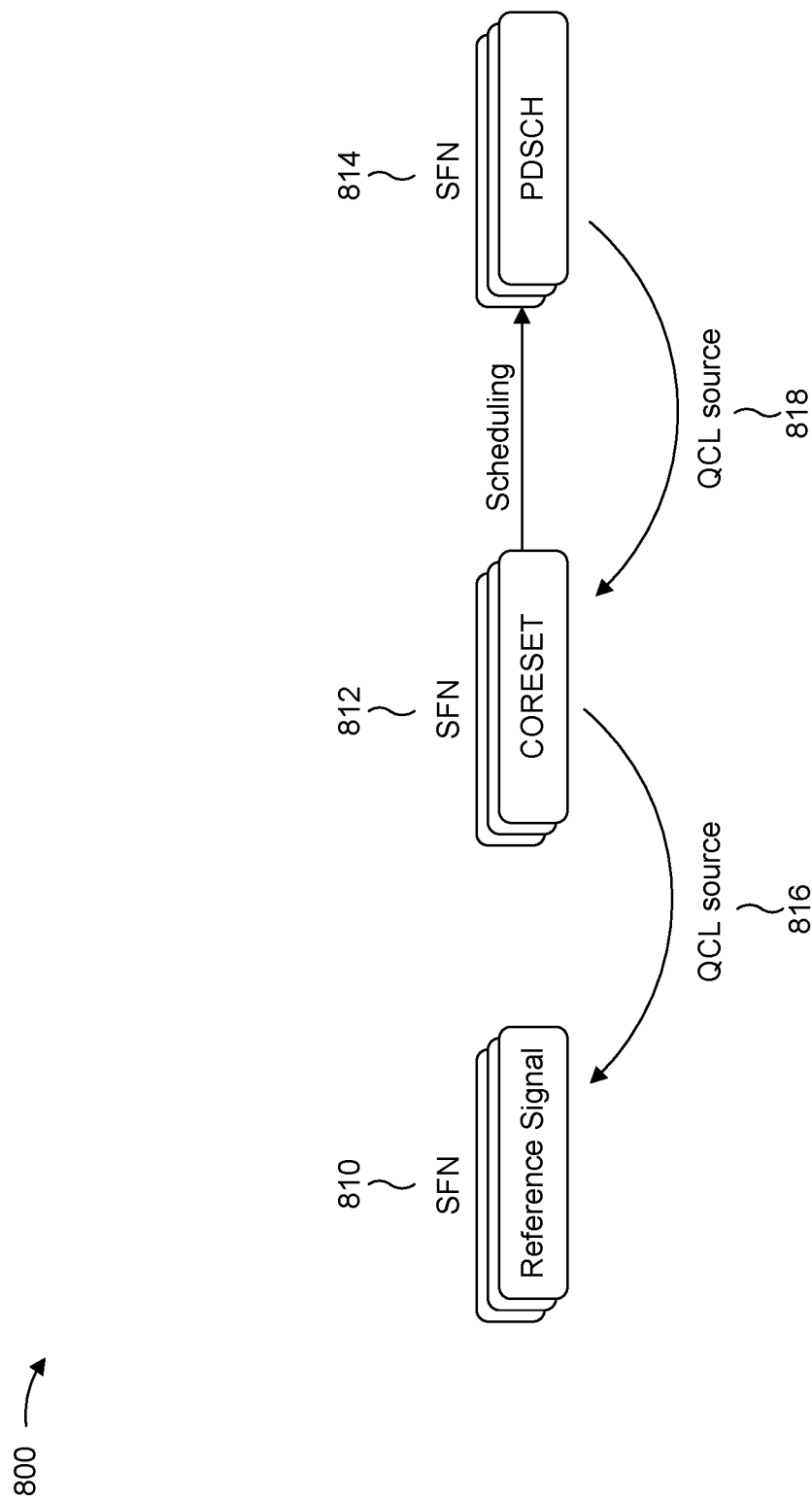
FIGS. 8A-8B are diagrams illustrating example quasi co-location (QCL) relationships to enable multicast data reception at a UE in accordance with various aspects of the present disclosure.
Figure 8B:
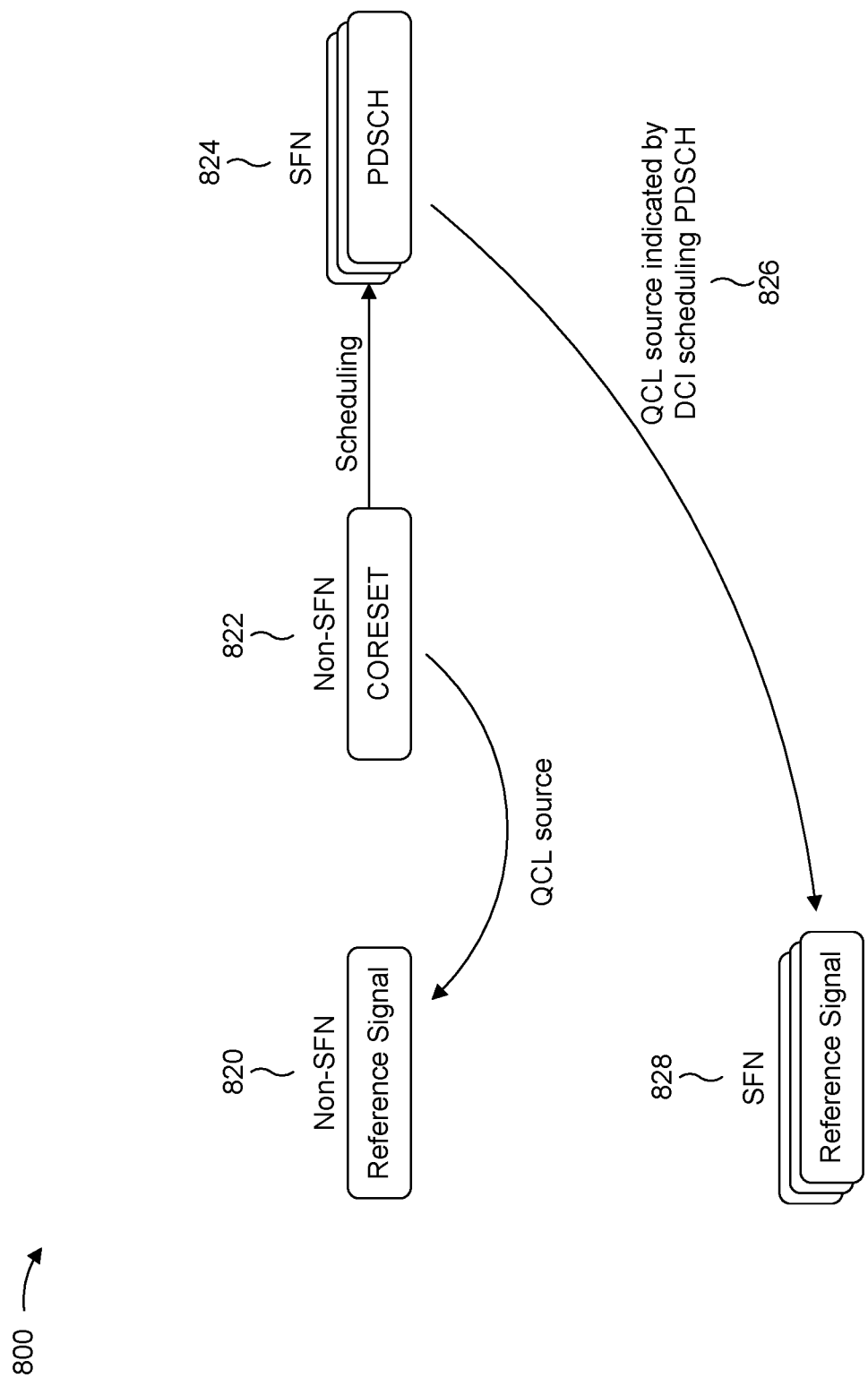

FIGS. 8A-8B are diagrams illustrating example QCL relationships 800 to enable multicast data reception at a UE in accordance with various aspects of the present disclosure. In particular, FIG. 8A illustrates an example QCL chain including QCL relationships (sometimes referred to as QCL assumptions) among a set of reference signals 810 (for example, a CSI-RS), a CORESET 812 for a PDCCH, and a PDSCH 814. In the example illustrated in FIG. 8A, the reference signals 810, the CORESET 812, and the PDSCH 814 are all transmitted in an SFN manner (for example, at the same time and over the same frequency channel). As indicated by reference numbers 816 and 818, a QCL assumption for the CORESET 812 may be that the reference signals 810 are a QCL source for the CORESET 812, and a QCL assumption for the PDSCH 814 may be that the CORESET 812 is a QCL source for the PDSCH 814. In other words, where the reference signals 810, the CORESET 812, and the PDSCH 814 are all transmitted in accordance with an SFN configuration (which may alternatively be referred to elsewhere herein as "SFNed"), the reference signals 810 provide the QCL source for the CORESET 812 used for transmitting the PDCCH scheduling the PDSCH 814, and the CORESET 812 provides the QCL source for multicast data transmitted on the PDSCH 814. For example, both the PDCCH demodulation reference signals (DMRS) associated with the CORESET 812 and the DMRS associated with the PDSCH 814 are QCLed with the reference signals 810, which means that the signals share specific channel properties (for example, spatial properties, delay properties, or Doppler properties, among other examples) such that channel properties associated with one signal can be inferred from channel properties associated with another signal in the QCL chain.

Accordingly, in multicast configurations where the network does not know which TRPs contribute to the SFN for each UE and the TRP(s) for the SFN is transparent to the UE(s) receiving the SFN multicast, the QCL chain illustrated in FIG. 8A may enable the UE(s) to receive the SFN multicast. For example, as shown, the PDSCH 814, the CORESET 812, and the reference signals 810 are SFNed among the TRP(s). Accordingly, a UE may be provided with a configuration associated with one of the reference signals 810, and because the reference signals 810, CORESET 812, and PDSCH 814 are all transmitted from the same set of TRPs 110, the UE can consider the PDSCH 814 to be QCLed with the CORESET 812, and may consider the CORESET 812 to be QCLed with the reference signals 810. From the reference signals 810 associated with the configuration provided to the UE, the UE can derive a QCL assumption from the reference signals 810 to the CORESET 812, as indicated by reference number 816, and derive a QCL assumption to the PDSCH 814, as indicated by reference number 818. In this way, the UE can use the configuration associated with the reference signals 810 and the QCL chain to receive the CORESET 812 and the PDSCH 814.

In some aspects, NR may support using the PDCCH (or CORESET 812) to indicate the QCL assumption for the PDSCH 814 (for example, in downlink control information (DCI)). Furthermore, as mentioned elsewhere herein, NR may support both SFN and non-SFN operation. For example, as shown in FIG. 8B, a reference signal 820 and a CORESET 822 may be transmitted by a particular TRP (for example, a current serving cell) in a non-SFN manner while a PDSCH 824 is transmitted by multiple TRPs in an SFN manner. In some aspects, as indicated by reference number 826, the CORESET 822 may indicate the QCL assumption for the PDSCH 824, which is QCL sourced by a set of reference signals 828 that are transmitted in accordance with an SFN configuration. Accordingly, in the example QCL relationship illustrated in FIG. 8B, the CORESET 822 is decoupled from the PDSCH 824, and one reference signal 820 may be configured to enable the UE to derive QCL assumptions to the SFNed reference signals 828. For example, the CORESET 822 may include a DCI field scheduling the PDSCH 824 for multicast data, and the DCI field may indicate a transmission configuration indicator (TCI) state pointing to the SFNed reference signals 828.

Figure 9A:
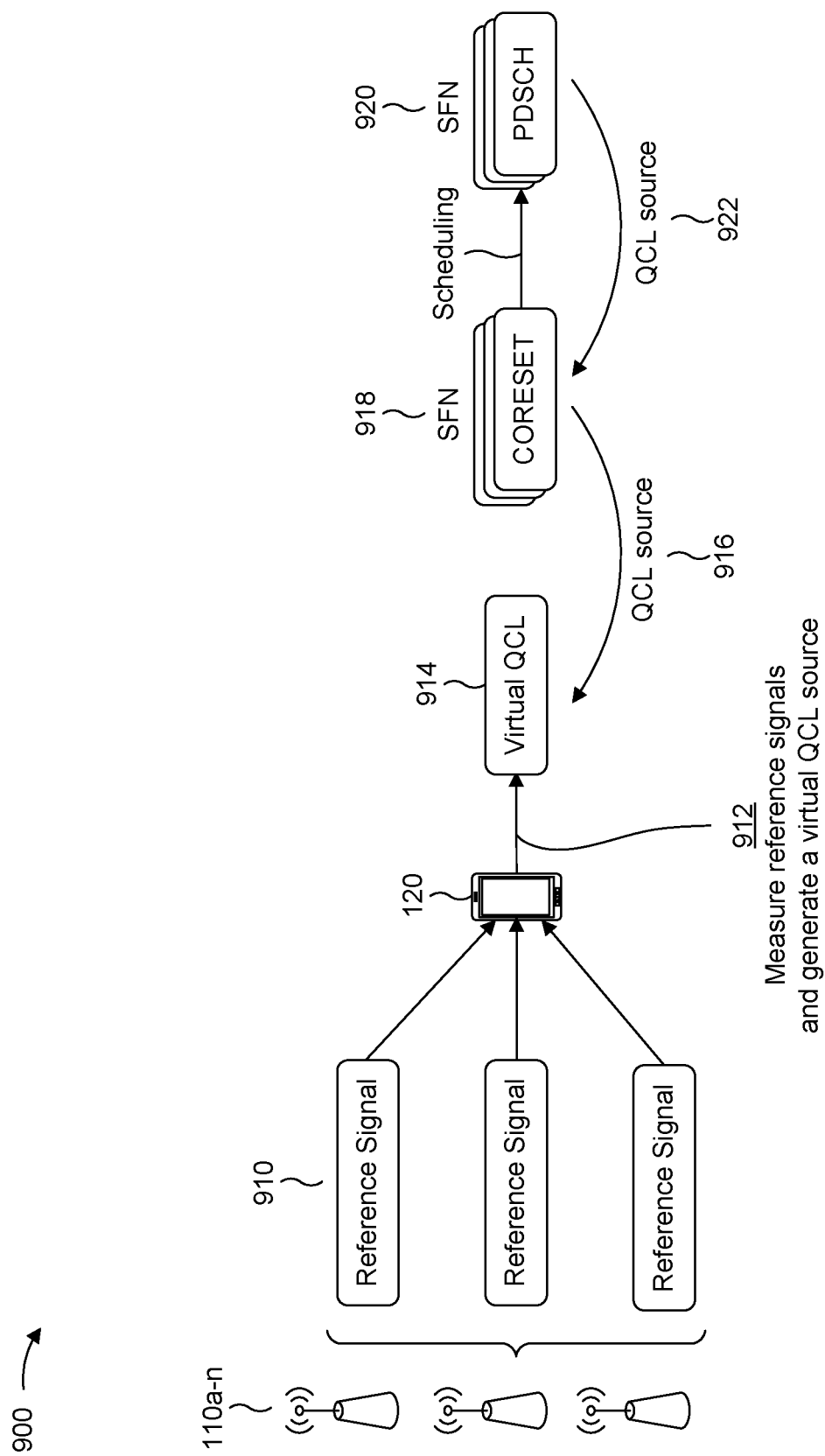
FIGS. 9A-9C are diagrams illustrating example techniques to derive a QCL property based on reference signals that have different QCL properties in accordance with various aspects of the present disclosure.
Figure 9B:
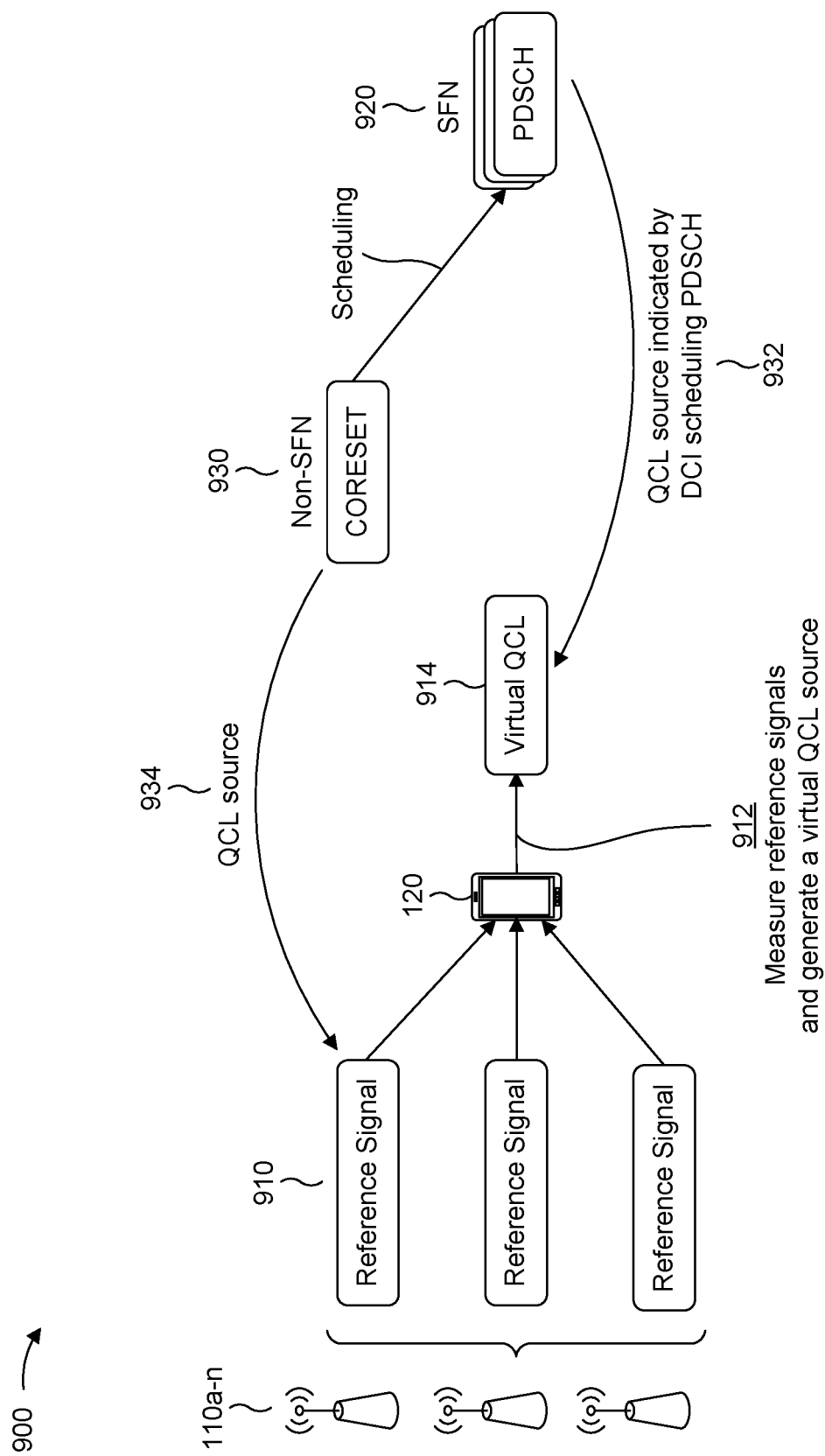
Figure 9C:
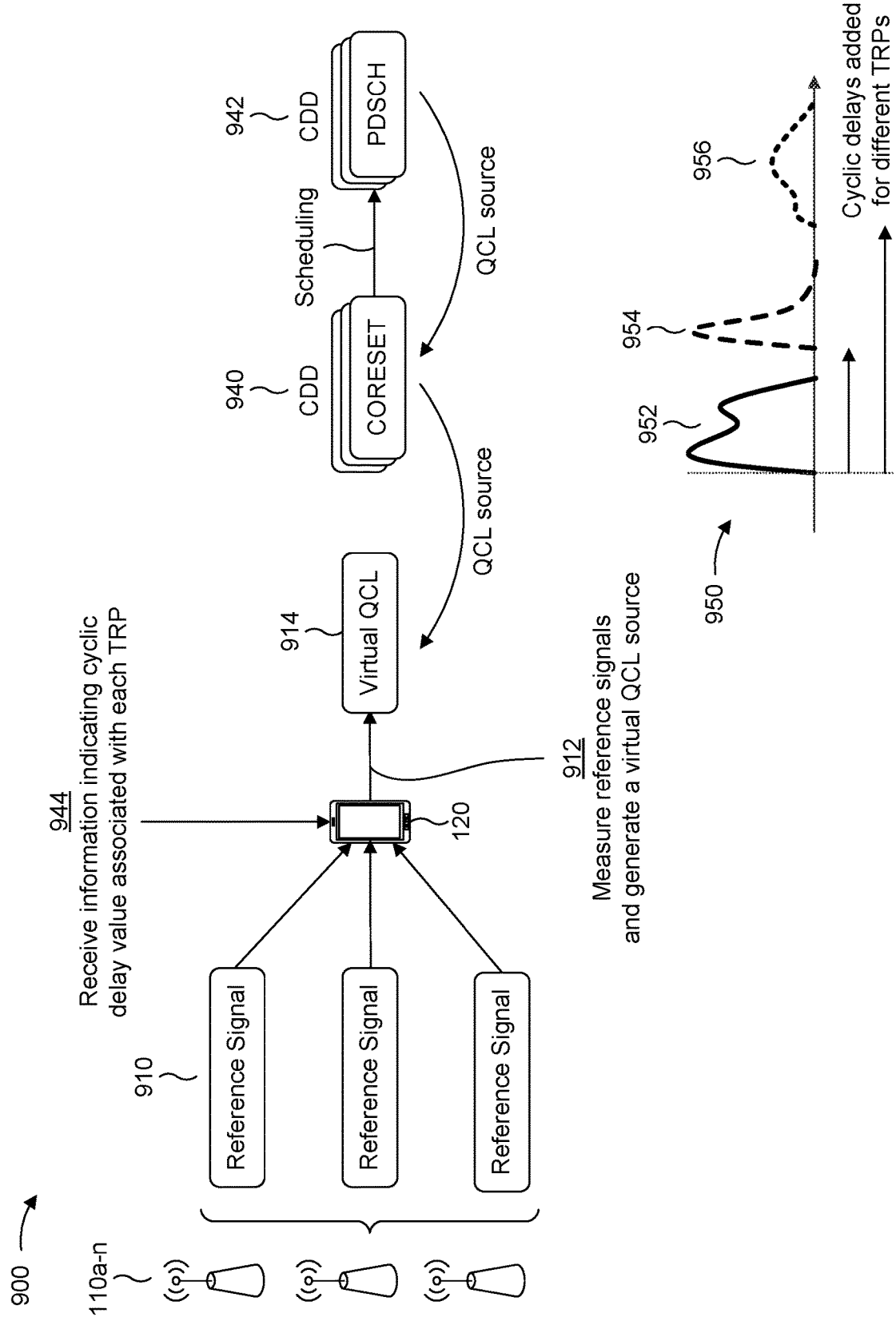

FIGS. 9A-9C are diagrams illustrating example techniques 900 to derive a QCL property based on reference signals that have different QCL properties in accordance with various aspects of the present disclosure.

For example, referring to FIG. 9A, a UE 120 may be configured to monitor a reference signal set that includes multiple individual reference signals 910 (for example, SSBs, CSI-RS, or TRS, among other examples) from a TRP set that includes one or more TRPs 110a-n joining an SFN multicast. As indicated by reference number 912, the UE 120 may measure the individual reference signals 910 and generate a virtual QCL source 914, which may generally correspond to a QCL property associated with the reference signals 910, which are individually associated with different sets of QCL properties (in contrast to the examples in FIGS. 8A-8B, where a single set of reference signals 810, 828 is SFNed among multiple cells). In some aspects, the multiple reference signals 910 that the UE 120 is configured to monitor may be orthogonal to one another, or more generally, the multiple reference signals 910 may differ with respect to one or more of a transmission time, frequency, or code. For example, in FIG. 9A, the UE 120 is configured to monitor three reference signals 910, which may be transmitted by three corresponding TRPs 110. However, because the reference signals 910 are orthogonal or otherwise differ with respect to time, frequency, or code, the UE 120 does not have an SFNed reference signal available to derive a QCL source for a CORESET 918 or a PDSCH 920.

Accordingly, as indicated by reference number 916, the UE 120 may use the virtual QCL source 914 that is generated based on the measurements related to the individual reference signals 910 as the QCL source for the CORESET 918 (or PDCCH) scheduling a multicast on the PDSCH 920. Furthermore, as indicated by reference number 922, the UE 120 may use the CORESET 918 as the QCL source for the PDSCH 920. Accordingly, in some aspects, the UE 120 may select a set of the individual reference signals 910 that have different QCL properties to derive the virtual QCL source 914, which can be used as the QCL source for multicast data transmitted on the PDSCH 920 or the CORESET 918 scheduling the PDSCH 920, which are both SFNed in the example illustrated in FIG. 9A.

For example, in one implementation, the UE 120 may generate the virtual QCL source 914 by constructing a channel estimate $h_i$ from each individual reference signal. In some aspects, the UE 120 may then sum all of the individual channel estimates into a virtual channel $h_{virtual} = \Sigma h_i$ and derive the virtual QCL source 914 based on one or more QCL properties associated with the virtual channel (for example, spatial properties, or Doppler properties, among other examples). In general, in order to use the virtual QCL source 914 as the QCL source for the CORESET 918 or the PDSCH 920, the virtual QCL source 914 may be generated to be equivalent or substantially equivalent to a real SFN channel used to transmit SFNed reference signals. For example, in order to be equivalent or substantially equivalent to the real SFN channel, the TRPs 110 joining the SFN multicast may transmit the individual (for example, orthogonal) reference signals 910 with the different sets of QCL properties close in time (for example, using resources in a same slot). Otherwise, if transmission times for the individual reference signals 910 were to be spaced far apart, the channel estimates associated with the individual reference signals 910 may change if or when the UE 120 changes location. Accordingly, in some aspects, the individual reference signals 910 used to derive the virtual QCL source 914 may have a maximum separation in time that satisfies a threshold value (for example, the maximum separation in time is less than a particular quantity of milliseconds, symbols, or slots, among other examples). In this way, by using different individual reference signals 910 that have different QCL properties to generate the virtual QCL source 914, resources may be conserved by avoiding a need to configure or coordinate an SFNed reference signal among different TRPs 110. Furthermore, in this way, the virtual QCL source 914 may enable multicast support in NR networks that support both SFN and non-SFN operation.

Additionally or alternatively, in another implementation, the UE 120 may generate the virtual QCL source 914 by constructing the channel estimate $h_i$ from each individual reference signal and then determining one or more QCL properties, $q_i$ associated with each channel estimate $h_i$. For example, in some aspects, the one or more QCL properties, $q_i$, associated with a given channel estimate $h_i$ may be a function of the channel estimate $h_i$. The QCL properties associated with the virtual QCL source 914 may then be determined based on the individual QCL properties, $q_i$, associated with the various individual channel estimates. For example, in some aspects, the individual QCL properties associated with the various individual channel estimates may be added, averaged, or filtered, among other examples, to determine the QCL properties associated with the virtual QCL source 914. In this way, the reference signals 910 may be located at any suitable TRP 110 in the serving area. Furthermore, in either implementation, the UE may obtain more than one channel estimate $h_i$ for one or more of the individual reference signals 910 (for example, to perform frequency tracking).

In some aspects, as mentioned above, the virtual QCL source 914 may generally be dependent on a specific QCL relationship (or specific QCL properties) in existence at a particular time. For example, the QCL relationship may change over time based on various factors, including mobility of the UE 120, changes to the configuration of the reference signals 910, or changes to the TRPs 110 that contribute to the SFN multicast, among other examples. Accordingly, in some aspects, one or more conditions may be defined for resetting and redetermining the virtual QCL source 914. For example, in some aspects, the UE 120 may reset and redetermine the virtual QCL source 914 when the reference signals 910 involved in the SFN multicast have changed since a previous determination, which may be explicitly indicated in information that the UE 120 receives from a base station (for example, in a MAC-CE indication). Additionally or alternatively, the UE 120 may be configured with one or more boundaries that define a threshold time period after which the virtual QCL source 914 is to be reset and redetermined. For example, in some aspects, the threshold value may be a threshold time period (for example, 100 milliseconds) such that the UE 120 resets and redetermines the virtual QCL source 914 when an elapsed time since a previous determination satisfies the threshold time period.

Referring again to FIG. 9A, as indicated by reference number 916, the QCL source of the CORESET 918 may be the virtual QCL source 914 that the UE 120 generated in the manner described above based on the individual (for example, orthogonal) reference signals 910 that are transmitted from multiple TRPs 110 with different sets of QCL properties. In this way, the UE 120 may determine the QCL source for the CORESET 918 and the PDSCH 920 without an SFNed reference signal coordinated among the multiple TRPs 110. In this way, the techniques described herein to generate the virtual QCL source 914 may enable multicast support in an NR network that supports both SFN and non-SFN operation.

Referring to FIG. 9B, the UE 120 may utilize similar techniques as described in further detail above to generate the virtual QCL source 914 for the PDSCH 920 in implementations where a CORESET 930 is transmitted in a non-SFN manner. For example, as mentioned elsewhere herein, the CORESET 930 may be transmitted on a PDCCH to indicate a QCL source for the PDSCH 920 (for example, in the DCI scheduling the PDSCH 920 for multicast data). Whereas FIG. 9A illustrates an example QCL chain in which the QCL source for the PDSCH 920 is the CORESET 918 and the QCL source for the CORESET 918 is the virtual QCL source 914, in FIG. 9B the QCL source for the PDSCH 920 is the virtual QCL source 914, as indicated by reference number 932. In particular, as indicated by reference number 934, the CORESET 930 is transmitted in a non-SFN manner by a particular TRP 110, and a QCL source for the CORESET 930 is one of the individual reference signals 910 monitored by the UE 120. The CORESET 930 may have a DCI scheduling the multicast data on the PDSCH 920, and the DCI may indicate the QCL source of the PDSCH 920, which is the virtual QCL source 914. Accordingly, the UE 120 may determine that the PDSCH 920 is QCLed with the virtual QCL source 914 generated by the UE 120 using the same or similar techniques as described in further detail above.

Referring to FIG. 9C, the UE 120 may also utilize similar techniques as described in further detail above to generate the virtual QCL source 914 in implementations in which different TRPs 110 transmit a CORESET 940 and a PDSCH 942 using cyclic delay diversity (CDD) (for example, using different cyclic delays). For example, as indicated by reference number 944, the UE may be configured with or otherwise receive information (for example, from a network node) that indicates cyclic delay values used by the different TRPs 110 when transmitting the CORESET 940 or the PDSCH 942. Accordingly, in some aspects, the UE 120 may take the individual cyclic delay values used by the various TRPs 110 into account when generating the virtual QCL source 914. For example, FIG. 9C illustrates an example implementation in which the CORESET 940 and the PDSCH 942 are transmitted from three TRPs 110 that apply different cyclic delays to the same signal (for example, the CORESET 940, or the PDSCH 942, among other examples). From the perspective of the UE 120, the signal can be observed in accordance with different delay paths or different multi-paths, which may enable improved frequency diversity relative to an SFN configuration. For example, in FIG. 9C, the UE 120 may receive a particular signal from multiple TRPs 110 in accordance with a delay profile 950, in which the illustrated example includes three signals 952, 954, 956 from three different TRPs 110 that apply different cyclic delays to the signal. In this way, the signal travels multiple paths and has a large delay profile 950, which results in an improved frequency diversity gain relative to an SFN configuration. In other words, SFN transmissions can be combined with CDD where different TRPs 110 apply different cyclic delays to the same signal to improve frequency diversity gain at the UE 120.

Figure 10A:
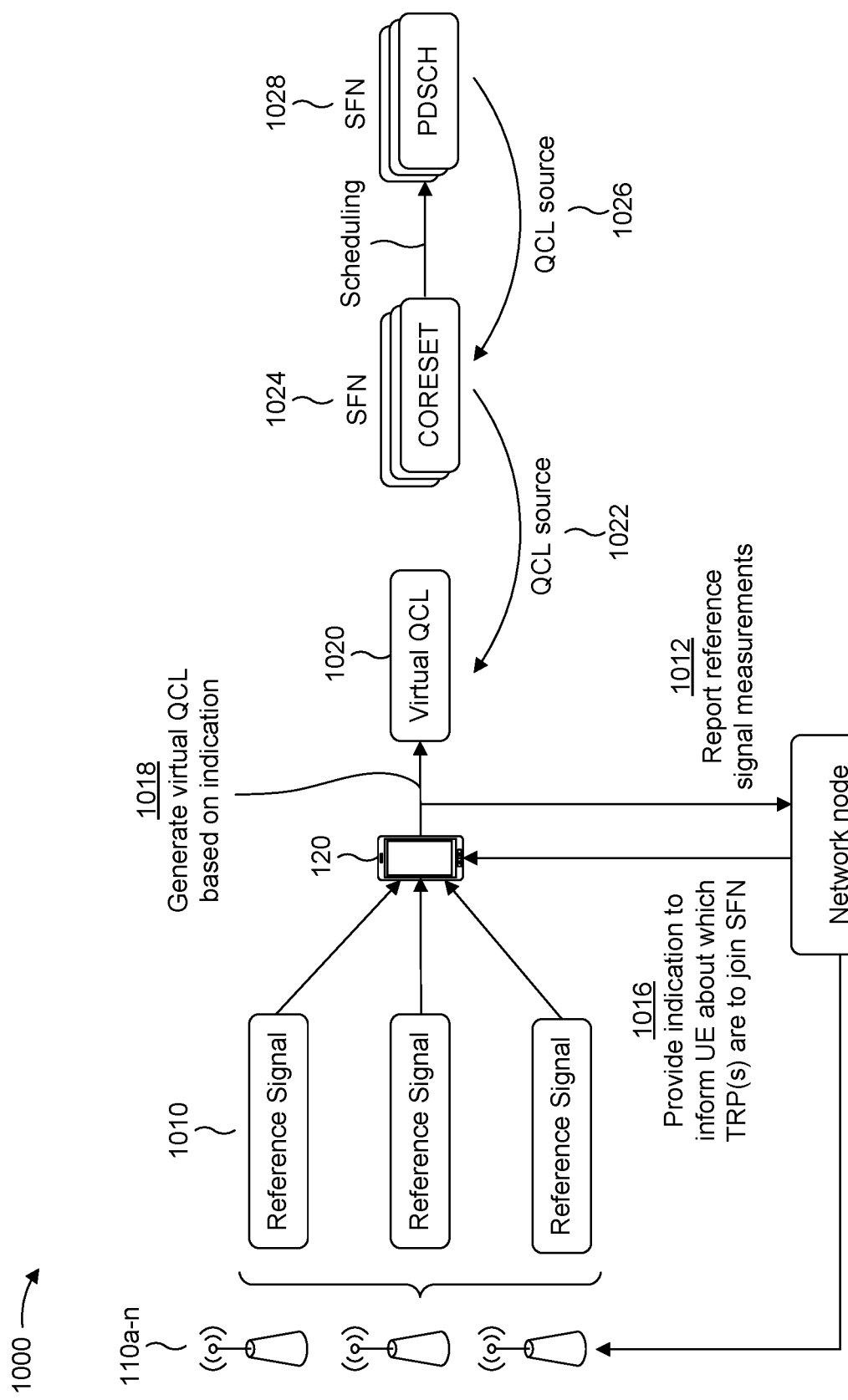
FIGS. 10A-10B are diagrams illustrating example techniques to derive a QCL property based on an indication received from a network node in accordance with various aspects of the present disclosure.
Figure 10B:
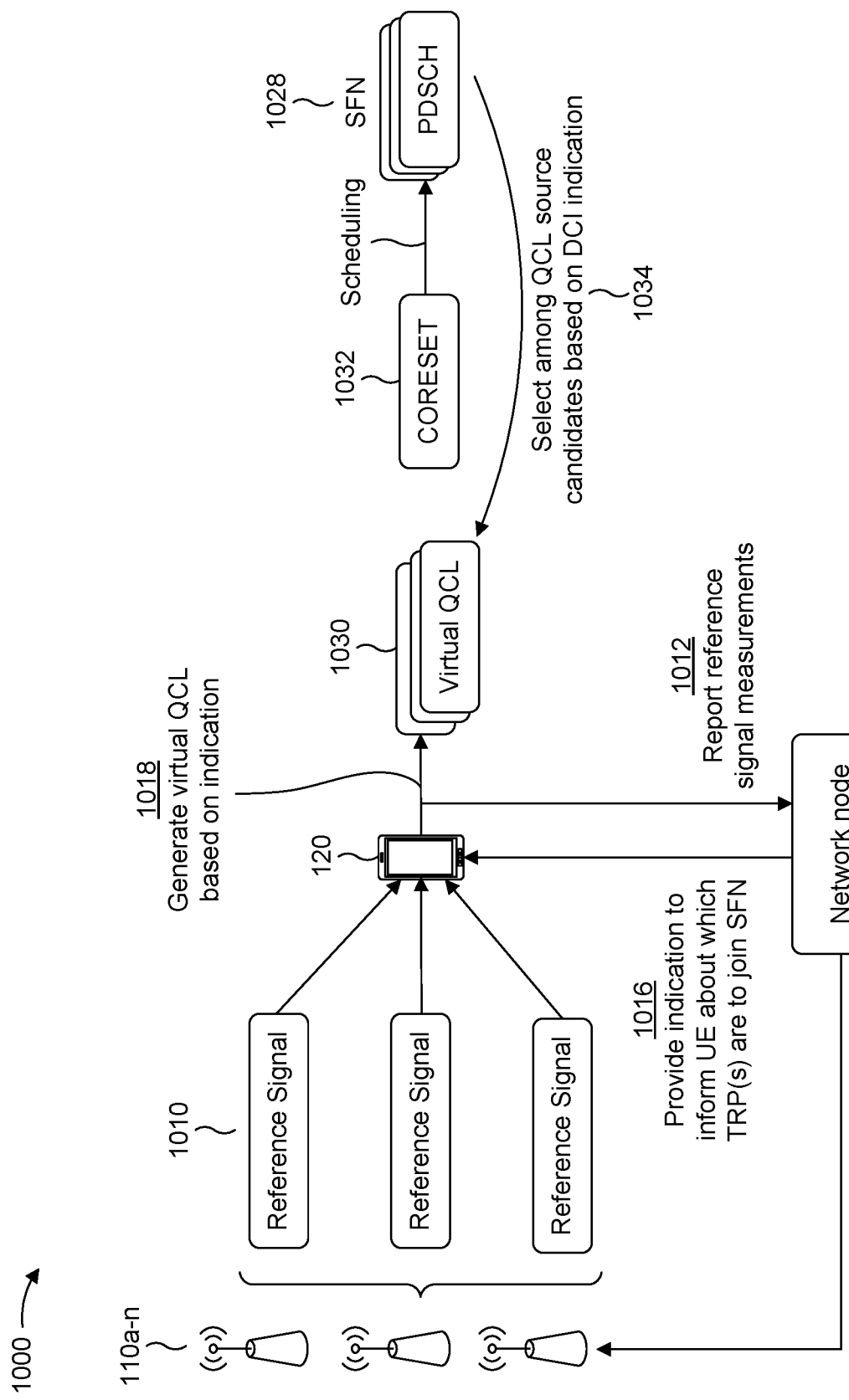

FIGS. 10A-10B are diagrams illustrating example techniques 1000 to derive a QCL property based on an indication received from a network node in accordance with various aspects of the present disclosure.

For example, referring to FIG. 10A, a UE 120 may be configured to monitor a reference signal set that includes multiple individual reference signals 1010 (for example, SSBs, CSI-RS, or TRS, among other examples) from a TRP set that includes one or more TRPs 110*a-n* joining an SFN multicast. Furthermore, in a similar manner as described above with respect to FIGS. 9A-9C, the individual reference signals 1010 may be transmitted in a non-SFN manner (for example, the individual reference signals 1010 are orthogonal or otherwise associated with different QCL properties). Nonetheless, the UE 120 may use the individual reference signals 1010 to generate a virtual QCL source 1020, which may enable the UE 120 determine a QCL relationship among the reference signals 1010, a PDSCH 1028 transmitted by the TRPs 110*a-n* joining the SFN multicast, and a CORESET 1024 scheduling the PDSCH 1028. Accordingly, in order to enable the UE 120 to generate the virtual QCL source 1020, the UE 120 may be provided with information to indicate which TRPs 110 are to join the SFN multicast.

For example, as indicated by reference number 1012, the UE 120 may measure the individual reference signals 910 and report the measurements related to the reference signals 1010 to a network node (for example, a network controller 130). As indicated by reference number 1014, the network node may then select a set of TRPs 110 to join the SFN multicast based on the measurements provided by the UE 120. As further indicated by reference number 1016, the network node may provide an indication to the UE 120 to inform the UE 120 about which TRP(s) 110 are to join the SFN multicast. As indicated by reference number 1018, the UE 120 may then generate the virtual QCL source 1020 based on the indication, in the same or a similar manner as described in further detail elsewhere herein. Accordingly, as indicated by reference number 1022, the UE 120 may use the virtual QCL source 1020 that is generated based on the indication received from the network node as the QCL source for the CORESET 1024 (or PDCCH) scheduling the multicast on the PDSCH 1028. Furthermore, as indicated by reference number 1026, the UE 120 may use the CORESET 1024 as the QCL source for the PDSCH 1028. Accordingly, in some aspects, the UE 120 may select a set of the individual reference signals 1010 based on the indication from the network node, and the selected set of the individual reference signals 1010 can be used to generate the virtual QCL source 1020 for multicast data transmitted on the PDSCH 1028 or the CORESET 1024 scheduling the PDSCH 1028, which are both SFNed in the example illustrated in FIG. 10A.

In some aspects, the indication that the network node provides to the UE 120 may be provided by a PDSCH medium access control (MAC) control element (MAC-CE) indication or a DCI indication, among other possibilities. For example, where the indication is a PDSCH MAC-CE indication, the PDSCH MAC-CE indication may include a bitmap to indicate whether the i-th TRP 110 is to join the SFN multicast such that the UE 120 is to use the i-th reference signal 1010 when generating the virtual QCL source 1020. For example, in an implementation where there are n TRPs 110, the bitmap included in the MAC-CE indication may include n bits, where each bit corresponds to one TRP 110. Accordingly, if the i-th bit is set to zero, the corresponding TRP 110 may be excluded from the SFN multicast, whereas the corresponding TRP 110 may be included from the SFN multicast if the i-th bit is set to one. Alternatively, in some aspects, an opposite configuration may be employed where a TRP 110 having index i may be included in the SFN multicast if the i-th bit is set to zero or excluded if the i-th bit is set to one. In some aspects, a mapping to indicate which reference signal 1010 corresponds to the i-th TRP 110 may generally be configured using a higher-layer (for example, a radio resource control (RRC)) parameter. Additionally or alternatively, in some aspects, the PDSCH MAC-CE indication may include a codepoint to indicate a set of TRPs 110 to join the SFN multicast such that the UE 120 is to use a set of reference signals 1010 that are associated with the set of TRPs 110 indicated in the codepoint when generating the virtual QCL source 1020. In some aspects, a mapping to indicate the set of reference signals 1010 that corresponds to the i-th codepoint of the MAC-CE may be configured using a higher-layer (for example, an RRC) parameter.

FIG. 10B illustrates another example implementation in which the indication that the network node provides to the UE 120 is a DCI indication. In such examples, the DCI received from the network node may include a DCI field including a codepoint to indicate a set of TRPs 110 to join the SFN multicast. In some aspects, the UE 120 may generate multiple virtual QCL sources 1030 in a similar manner as described in further detail above, except that each of the multiple virtual QCL sources 1030 may be associated with a different combination or permutation of the reference signals 1010 monitored by the UE 120. Furthermore, a CORESET 1032 scheduling multicast data to the UE 120 on the PDSCH 1028 may include the DCI indication to indicate which virtual QCL source 1030 is to be used to receive the PDSCH 1028. Accordingly, in some aspects, as indicated by reference number 1034, the UE 120 may select one of the virtual QCL sources 1030 to be used as a QCL source for the PDSCH 1028 based on the DCI indication provided by the CORESET 1032 scheduling the PDSCH 1028. For example, the DCI indication may indicate the set of TRPs 110 to join the SFN multicast, and the UE 120 may use one of the virtual QCL sources 1030 derived from a set of reference signals 1010 that are associated with the set of TRPs 110 indicated in the DCI indication. In some aspects, a mapping to indicate the set of reference signals 1010 that corresponds to the i-th codepoint of the DCI indication may be configured using a higher-layer (for example, an RRC) parameter.

FIG. 11 is a diagram illustrating an example process 1100 performed, for example, by a UE in accordance with various aspects of the present disclosure. Example process 1100 is an example where a UE (for example, UE 120) performs operations relating to determining an SFN QCL source for multicast.

As shown in FIG. 11, in some aspects, process 1100 may include obtaining measurements related to a plurality of reference signals received by the UE, wherein each of the plurality of reference signals is associated with a different set of QCL properties (block 1110). For example, the UE (for example, using receive processor 258, transmit processor 264, controller/processor 280, or memory 282, among other examples) may obtain measurements related to a plurality of reference signals received by the UE, as described above. In some aspects, each of the plurality of reference signals is associated with a different set of QCL properties.

As further shown in FIG. 11, in some aspects, process 1100 may include determining a QCL property based at least in part on the measurements related to the plurality of reference signals (block 1120). For example, the UE (for example, using receive processor 258, transmit processor 264, controller/processor 280, or memory 282, among other examples) may determine a QCL property based at least in part on the measurements related to the plurality of reference signals, as described above.

As further shown in FIG. 11, in some aspects, process 1100 may include determining, based at least in part on the determined QCL property, a QCL relationship among the plurality of reference signals and a PDSCH (block 1130). For example, the UE (for example, using receive processor 258, transmit processor 264, controller/processor 280, or memory 282, among other examples) may determine, based at least in part on the determined QCL property, a QCL relationship among the plurality of reference signals and a PDSCH, as described above.

As further shown in FIG. 11, in some aspects, process 1100 may include receiving the PDSCH based at least in part on the QCL relationship (block 1140). For example, the UE (for example, using receive processor 258, transmit processor 264, controller/processor 280, or memory 282, among other examples) may receive the PDSCH based at least in part on the QCL relationship, as described above.

Process 1100 may include additional aspects, such as any single aspect or any combination of aspects described below or in connection with one or more other processes described elsewhere herein.

In a first additional aspect, the plurality of reference signals include one or more SSBs, CSI-RSs, or TRSs that have different QCL properties.

In an additional second aspect, alone or in combination with the first additional aspect, the PDSCH includes multicast data.

In a third additional aspect, alone or in combination with one or more of the first and second additional aspects, the plurality of reference signals are associated with one or more TRPs contributing to an SFN.

In a fourth additional aspect, alone or in combination with one or more of the first through third additional aspects, the plurality of reference signals are orthogonal to one another.

In a fifth additional aspect, alone or in combination with one or more of the first through fourth additional aspects, the plurality of reference signals are identified by at least one of time, frequency, or code, and the plurality of reference signals differ by at least one of time, frequency, or code.

In a sixth additional aspect, alone or in combination with one or more of the first through fifth additional aspects, when determining the QCL relationship among the plurality of reference signals and the PDSCH, the UE may determine, based at least in part on the QCL property, a QCL relationship among the plurality of reference signals, the PDSCH, and a CORESET associated with a PDCCH scheduling the PDSCH.

In a seventh additional aspect, alone or in combination with one or more of the first through sixth additional aspects, one reference signal in the plurality of reference signals is a QCL source for the CORESET.

In an eighth additional aspect, alone or in combination with one or more of the first through seventh additional aspects, when determining the QCL property, the UE may sum individual channel estimates associated with each reference signal in the plurality of reference signals into a virtual channel and determine the QCL property based at least in part on the virtual channel.

In a ninth additional aspect, alone or in combination with one or more of the first through eighth additional aspects, the UE may receive the plurality of reference signals in a same slot.

In a tenth additional aspect, alone or in combination with one or more of the first through ninth additional aspects, a maximum separation in transmission times among the plurality of reference signals satisfies a threshold value.

In an eleventh additional aspect, alone or in combination with one or more of the first through tenth additional aspects, when determining the QCL property, the UE may construct individual channel estimates associated with each reference signal in the plurality of reference signals and determine the QCL property based at least in part on QCL properties associated with each of the individual channel estimates.

In a twelfth additional aspect, alone or in combination with one or more of the first through eleventh additional aspects, the UE may determine the QCL property by one or more of adding, averaging, or filtering the QCL properties associated with each of the individual channel estimates.

In a thirteenth additional aspect, alone or in combination with one or more of the first through twelfth additional aspects, the UE may receive information related to respective cyclic delay values that one or more TRPs use when transmitting one or more of the PDSCH or a CORESET scheduling the PDSCH, and the QCL property may be determined based at least in part on the respective cyclic delay values used by the one or more TRPs.

In a fourteenth additional aspect, alone or in combination with one or more of the first through thirteenth additional aspects, the UE may report the measurements related to the plurality of reference signals to a network node to enable the network node to select one or more TRPs to join an SFN to transmit the PDSCH for the UE, receive, from the network node, information identifying the one or more TRPs to join the SFN to transmit the PDSCH for the UE, and determine the QCL property based at least in part on the information identifying the one or more TRPs.

In a fifteenth additional aspect, alone or in combination with one or more of the first through fourteenth additional aspects, the UE may receive the information identifying the one or more TRPs to be included in the SFN in a MAC-CE indication.

In a sixteenth additional aspect, alone or in combination with one or more of the first through fifteenth additional aspects, the MAC-CE indication includes a bitmap to individually indicate the one or more TRPs to be included in the SFN.

In a seventeenth additional aspect, alone or in combination with one or more of the first through sixteenth additional aspects, the MAC-CE indication includes a codepoint to indicate the one or more TRPs to be included in the SFN.

In an eighteenth additional aspect, alone or in combination with one or more of the first through seventeenth additional aspects, the information identifying the one or more TRPs to be included in the SFN is received in a DCI field.

In a nineteenth additional aspect, alone or in combination with one or more of the first through eighteenth additional aspects, the UE may redetermine the QCL property based at least in part on one or more conditions indicating that one or more of the plurality of reference signals have changed since a previous determination.

In a twentieth additional aspect, alone or in combination with one or more of the first through nineteenth additional aspects, the UE may receive, from a base station, information indicating that the one or more of the plurality of reference signals have changed since the previous determination.

In a twenty-first additional aspect, alone or in combination with one or more of the first through twentieth additional aspects, the one or more conditions are satisfied based at least in part on a threshold time period elapsing since the previous determination.

Although FIG. 11 shows example blocks of process 1100, in some aspects, process 1100 may include additional blocks, fewer blocks, different blocks, or differently arranged blocks than those depicted in FIG. 11. Additionally or alternatively, two or more of the blocks of process 1100 may be performed in parallel.

Figure 12:
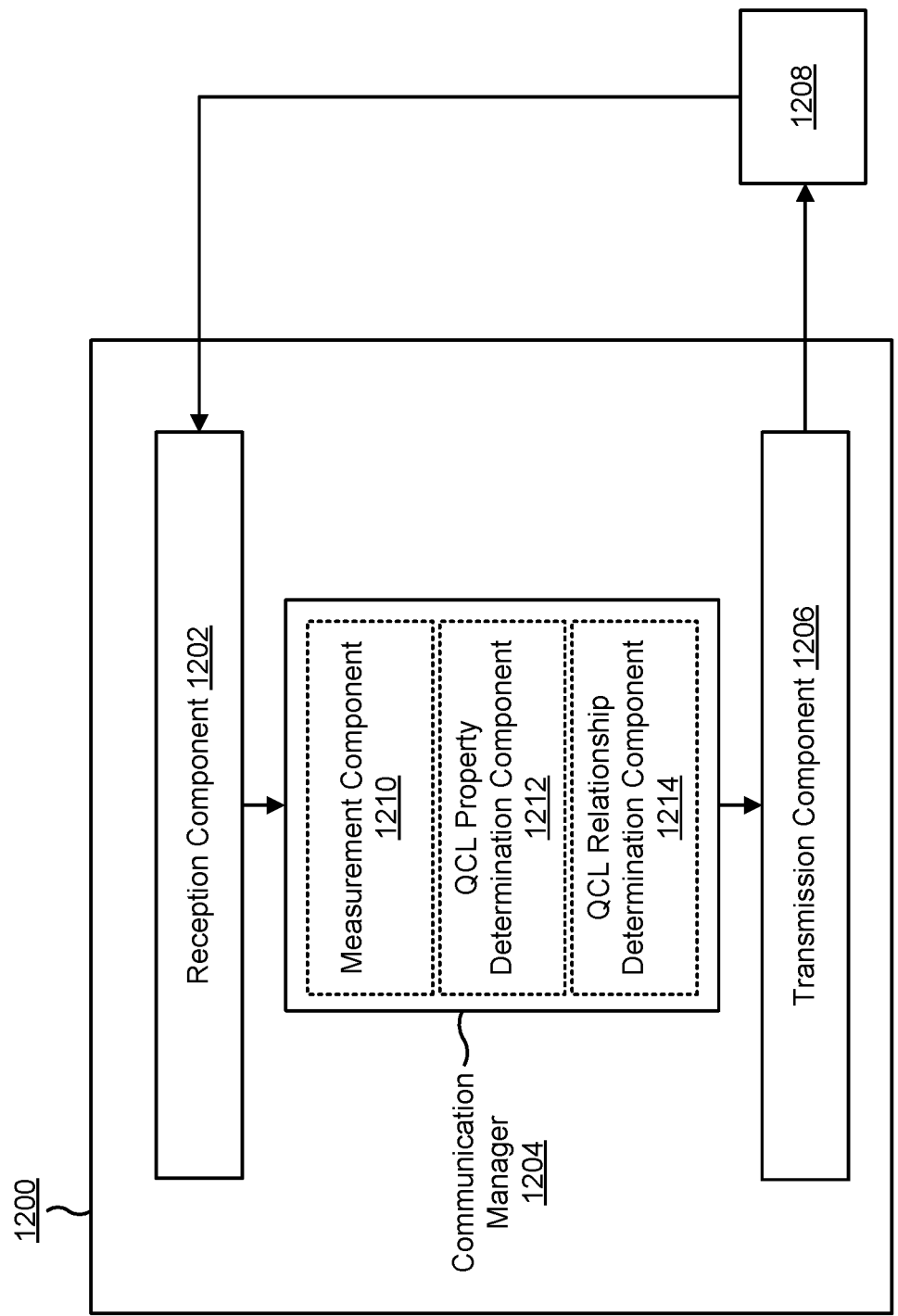
FIG. 12 is a diagram of an example apparatus for wireless communication in accordance with various aspects of the present disclosure.

FIG. 12 is a block diagram of an example apparatus 1200 for wireless communication in accordance with various aspects of the present disclosure. The apparatus 1200 may be a UE, or a UE may include the apparatus 1200. In some aspects, the apparatus 1200 includes a reception component 1202, a communication manager 1204, and a transmission component 1206, which may be in communication with one another (for example, via one or more buses). As shown, the apparatus 1200 may communicate with another apparatus 1208 (such as a UE, a base station, or another wireless communication device) using the reception component 1202 and the transmission component 1206.

In some aspects, the apparatus 1200 may be configured to perform one or more operations described herein in connection with FIGS. 9A-9C, FIGS. 10A-10B, or combinations thereof. Additionally or alternatively, the apparatus 1200 may be configured to perform one or more processes described herein, such as process 1100 of FIG. 11. In some aspects, the apparatus 1200 may include one or more components of the UE described above in connection with FIG. 2.

The reception component 1202 may receive communications, such as reference signals, control information, data communications, or a combination thereof, from the apparatus 1208. The reception component 1202 may provide received communications to one or more other components of the apparatus 1200, such as the communication manager 1204. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1202 may include one or more antennas, a demodulator, a MIMO detector, a receive processor, a controller/processor, a memory, or a combination thereof, of the UE described above in connection with FIG. 2.

The transmission component 1206 may transmit communications, such as reference signals, control information, data communications, or a combination thereof, to the apparatus 1208. In some aspects, the communication manager 1204 may generate communications and may transmit the generated communications to the transmission component 1206 for transmission to the apparatus 1208. In some aspects, the transmission component 1206 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1206 may include one or more antennas, a modulator, a transmit MIMO processor, a transmit processor, a controller/processor, a memory, or a combination thereof, of the UE described above in connection with FIG. 2. In some aspects, the transmission component 1206 may be collocated with the reception component 1202 in a transceiver.

The communication manager 1204 may obtain or may cause the reception component 1202 to obtain measurements related to a plurality of reference signals received by the UE, where each of the plurality of reference signals is associated with a different set of QCL properties. The communication manager 1204 may determine a QCL property based at least in part on the measurements related to the plurality of reference signals. The communication manager 1204 may determine, based at least in part on the determined QCL property, a QCL relationship among the plurality of reference signals and a PDSCH. The communication manager 1204 may receive or may cause the reception component 1202 to receive the PDSCH based at least in part on the QCL relationship. In some aspects, the communication manager 1204 may include a controller/processor, a memory, or a combination thereof, of the UE described above in connection with FIG. 2.

In some aspects, the communication manager 1204 may include a set of components, such as a measurement component 1210, a QCL property determination component 1212, a QCL relationship determination component 1214, or a combination thereof. Alternatively, the set of components may be separate and distinct from the communication manager 1204. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The measurement component 1210 may obtain measurements related to a plurality of reference signals received by the UE, where each of the plurality of reference signals is associated with a different set of QCL properties. The QCL property determination component 1212 may determine a QCL property based at least in part on the measurements related to the plurality of reference signals. The QCL relationship determination component 1214 may determine, based at least in part on the determined QCL property, a QCL relationship among the plurality of reference signals and a PDSCH. The reception component 1202 may receive the PDSCH based at least in part on the QCL relationship.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally or alternatively, a set of (one or more) components shown in FIG. 12 may perform one or more functions described as being performed by another set of components shown in FIG. 12.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or combinations thereof.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A method of wireless communication performed by a user equipment (UE), comprising:
    obtaining measurements related to a plurality of reference signals received by the UE, wherein each of the plurality of reference signals is associated with a different set of quasi co-location (QCL) properties;
    determining a QCL property based at least in part on the measurements related to the plurality of reference signals;
    determining, based at least in part on the determined QCL property, a QCL relationship among the plurality of reference signals and a physical downlink shared channel (PDSCH); and
    receiving the PDSCH based at least in part on the QCL relationship.

2. The method of claim 1, wherein the plurality of reference signals include one or more synchronization signal blocks (SSBs), channel state information reference signals (CSI-RS), or tracking reference signals (TRS) that have different QCL properties.

3. The method of claim 1, wherein the PDSCH includes multicast data.

4. The method of claim 1, wherein the plurality of reference signals are associated with one or more transmit receive points (TRPs) contributing to a single-frequency network (SFN).

5. The method of claim 1, wherein the plurality of reference signals are orthogonal to one another.

6. The method of claim 1, wherein the plurality of reference signals are identified by at least one of time, frequency, or code, and wherein the plurality of reference signals differ by at least one of time, frequency, or code.

7. The method of claim 1, wherein determining the QCL relationship among the plurality of reference signals and the PDSCH further comprises determining, based at least in part on the QCL property, a QCL relationship among the plurality of reference signals, the PDSCH, and a control resource set associated with a physical downlink control channel (PDCCH) scheduling the PDSCH.

8. The method of claim 1, further comprising receiving a control resource set (CORESET) associated with a physical downlink control channel (PDCCH) scheduling the PDSCH, wherein one reference signal in the plurality of reference signals is a QCL source for the CORESET.

9. The method of claim 1, wherein determining the QCL property includes:
    summing individual channel estimates associated with each reference signal in the plurality of reference signals into a virtual channel; and
    determining the QCL property based at least in part on the virtual channel.

10. The method of claim 1, wherein determining the QCL property includes:
    constructing individual channel estimates associated with each reference signal in the plurality of reference signals; and
    determining the QCL property based at least in part on QCL properties associated with each of the individual channel estimates, wherein determining the QCL property includes one or more of adding, averaging, or filtering the QCL properties associated with each of the individual channel estimates.

11. The method of claim 1, further comprising receiving information related to respective cyclic delay values that one or more transmit receive points (TRPs) use when transmitting one or more of the PDSCH or a control resource set (CORESET) scheduling the PDSCH, wherein the QCL property is determined based at least in part on the respective cyclic delay values used by the one or more TRPs.

12. The method of claim 1, further comprising:
    reporting the measurements related to the plurality of reference signals to a network node to enable the network node to select one or more transmit receive points (TRPs) to join a single-frequency network (SFN) to transmit the PDSCH for the UE;
    receiving, from the network node, information identifying the one or more TRPs to join the SFN to transmit the PDSCH for the UE; and
    determining the QCL property based at least in part on the information identifying the one or more TRPs.

13. The method of claim 12, wherein the information identifying the one or more TRPs to be included in the SFN is received in a medium access control (MAC) control element (MAC-CE) indication or a downlink control information (DCI) field.

14. The method of claim 1, further comprising redetermining the QCL property based at least in part on one or more conditions indicating that one or more of the plurality of reference signals have changed since a previous determination.

15. A user equipment (UE) for wireless communication, comprising:
a memory; and
one or more processors operatively coupled to the memory, the memory and the one or more processors configured to:
obtain measurements related to a plurality of reference signals received by the UE, wherein each of the plurality of reference signals is associated with a different set of quasi co-location (QCL) properties;
determine a QCL property based at least in part on the measurements related to the plurality of reference signals;
determine, based at least in part on the determined QCL property, a QCL relationship among the plurality of reference signals and a physical downlink shared channel (PDSCH); and
receive the PDSCH based at least in part on the QCL relationship.

16. The UE of claim 15, wherein the plurality of reference signals include one or more synchronization signal blocks (SSBs), channel state information reference signals (CSI-RS), or tracking reference signals (TRS) that have different QCL properties.

17. The UE of claim 15, wherein the PDSCH includes multicast data.

18. The UE of claim 15, wherein the plurality of reference signals are associated with one or more transmit receive points (TRPs) contributing to a single-frequency network (SFN).

19. The UE of claim 15, wherein the plurality of reference signals are orthogonal to one another.

20. The UE of claim 15, wherein the plurality of reference signals are identified by at least one of time, frequency, or code, and wherein the plurality of reference signals differ by at least one of time, frequency, or code.

21. The UE of claim 15, wherein the memory and the one or more processors are configured to determine the QCL relationship among the plurality of reference signals and the PDSCH by determining, based at least in part on the QCL property, a QCL relationship among the plurality of reference signals, the PDSCH, and a control resource set associated with a physical downlink control channel (PDCCH) scheduling the PDSCH.

22. The UE of claim 15, wherein the memory and the one or more processors are further configured to receive a control resource set (CORESET) associated with a physical downlink control channel (PDCCH) scheduling the PDSCH, wherein one reference signal in the plurality of reference signals is a QCL source for the CORESET.

23. The UE of claim 15, wherein the memory and the one or more processors are configured to determine the QCL property by:
summing individual channel estimates associated with each reference signal in the plurality of reference signals into a virtual channel; and
determining the QCL property based at least in part on the virtual channel.

24. The UE of claim 15, wherein the memory and the one or more processors are configured to determine the QCL property by:
constructing individual channel estimates associated with each reference signal in the plurality of reference signals; and
determining the QCL property based at least in part on QCL properties associated with each of the individual channel estimates, wherein determining the QCL property includes one or more of adding, averaging, or filtering the QCL properties associated with each of the individual channel estimates.

25. The UE of claim 15, wherein the memory and the one or more processors are further configured to receive information related to respective cyclic delay values that one or more transmit receive points (TRPs) use when transmitting one or more of the PDSCH or a control resource set (CORESET) scheduling the PDSCH, wherein the QCL property is determined based at least in part on the respective cyclic delay values used by the one or more TRPs.

26. The UE of claim 15, wherein the one or more processors are further configured to:
report the measurements related to the plurality of reference signals to a network node to enable the network node to select one or more transmit receive points (TRPs) to join a single-frequency network (SFN) to transmit the PDSCH for the UE;
receive, from the network node, information identifying the one or more TRPs to join the SFN to transmit the PDSCH for the UE; and
determine the QCL property based at least in part on the information identifying the one or more TRPs.

27. The UE of claim 26, wherein the information identifying the one or more TRPs to be included in the SFN is received in a medium access control (MAC) control element (MAC-CE) indication or a downlink control information (DCI) field.

28. The UE of claim 15, wherein the memory and the one or more processors are further configured to redetermine the QCL property based at least in part on one or more conditions indicating that one or more of the plurality of reference signals have changed since a previous determination.

29. A non-transitory computer-readable medium storing one or more instructions for wireless communication, the one or more instructions comprising:
one or more instructions that, when executed by one or more processors of a user equipment (UE), cause the one or more processors to:
obtain measurements related to a plurality of reference signals received by the UE, wherein each of the plurality of reference signals is associated with a different set of quasi co-location (QCL) properties;
determine a QCL property based at least in part on the measurements related to the plurality of reference signals;
determine, based at least in part on the determined QCL property, a QCL relationship among the plurality of reference signals and a physical downlink shared channel (PDSCH); and
receive the PDSCH based at least in part on the QCL relationship.

30. An apparatus for wireless communication, comprising:
means for obtaining measurements related to a plurality of reference signals received by the apparatus, wherein each of the plurality of reference signals is associated with a different set of quasi co-location (QCL) properties;

means for determining a QCL property based at least in part on the measurements related to the plurality of reference signals;

means for determining, based at least in part on the determined QCL property, a QCL relationship among the plurality of reference signals and a physical downlink shared channel (PDSCH); and means for receiving the PDSCH based at least in part on the QCL relationship.

\* \* \* \* \*